United States Patent [19]
Rice et al.

[11] Patent Number: 5,677,522
[45] Date of Patent: Oct. 14, 1997

[54] METHOD AND APPARATUS FOR NON-CONTACT READING OF A RELIEF PATTERN

[75] Inventors: David A. Rice, Syracuse, N.Y.; Jacobus M. Oschmann, Tucson, Ariz.; Edward M. Valovage, Memphis; Marc J. Viggiano, Manlius, both of N.Y.

[73] Assignee: Sensis Corporation, Dewitt, N.Y.

[21] Appl. No.: 395,420

[22] Filed: Feb. 27, 1995

Related U.S. Application Data

[63] Continuation-in-part of Ser. No. 95,727, Jul. 21, 1993, Pat. No. 5,393,967.

[51] Int. Cl.$^6$ ...................................................... G06K 7/10
[52] U.S. Cl. ........................... 235/454; 235/462; 235/472; 235/494; 382/218; 382/292
[58] Field of Search ..................................... 235/454, 470, 235/471, 472, 462, 494; 382/218, 291, 292

[56] References Cited

U.S. PATENT DOCUMENTS

| | | | |
|---|---|---|---|
| 3,751,636 | 8/1973 | Coles, Jr. | 235/462 |
| 4,015,240 | 3/1977 | Swonger et al. | 382/291 X |
| 4,404,593 | 9/1983 | Shanley, II et al. | 358/158 |
| 4,521,678 | 6/1985 | Winter | 235/462 X |
| 4,625,101 | 11/1986 | Hinks et al. | 235/454 X |
| 4,694,182 | 9/1987 | Howard | 235/472 X |
| 4,700,078 | 10/1987 | Mizuno et al. | 235/454 X |
| 4,724,322 | 2/1988 | Knowies et al. | 235/454 X |
| 4,731,861 | 3/1988 | Blanton et al. | 382/291 X |
| 4,748,677 | 5/1988 | Yokomizo | 382/50 |
| 4,750,210 | 6/1988 | Lindsey et al. | 382/291 |
| 5,101,184 | 3/1992 | Antes | 235/454 |
| 5,331,176 | 7/1994 | Sant'Anselmo et al. | 235/472 X |
| 5,357,093 | 10/1994 | Netter et al. | 235/470 X |
| 5,408,080 | 4/1995 | Zazek et al. | 235/472 X |
| 5,426,520 | 6/1995 | Kakae et al. | 235/472 X |
| 5,430,282 | 7/1995 | Smith et al. | 235/455 |
| 5,453,604 | 9/1995 | Narabu | 235/472 X |

FOREIGN PATENT DOCUMENTS

| | | | |
|---|---|---|---|
| 0112256 | 6/1984 | European Pat. Off. | G06K 7/10 |
| 55-115164 | 9/1980 | Japan . | |
| 63-67692 | 3/1988 | Japan . | |

Primary Examiner—Donald T. Hajec
Assistant Examiner—Michael G. Lee
Attorney, Agent, or Firm—Harris Beach & Wilcox, LLP

[57] ABSTRACT

An improved non-contact apparatus and method for reading a surface that has information encoded in a relief pattern thereon, includes an optical transmitter for projecting a line of light onto the relief pattern at a first angle to a normal of the surface; an optical receiver that views the projected line of light at a second angle to the normal of the surface and produces signal data that is representative of an image of the reflection thereon. The image viewed by the receiver has parallactic displacements of the line of illumination that occur at transitions between raised and recessed portions of the relief pattern. The signal data is culled such that only those pixels surrounding the line of light are selected. The culled signal data is then decoded into electrical signals which represent decoded information contained in the relief pattern. The optical receiver can be realized as a plurality of light sensors arranged in a linear, or a two dimensional array, together with suitable focusing optics. The optical transmitter can produce either a fan beam of light or sweep a spot of light across the surface. The optical transmitter, optical receiver, the culling, circuit and the decoding circuit contained within either a portable hand-held unit or a fixed mount unit.

18 Claims, 19 Drawing Sheets

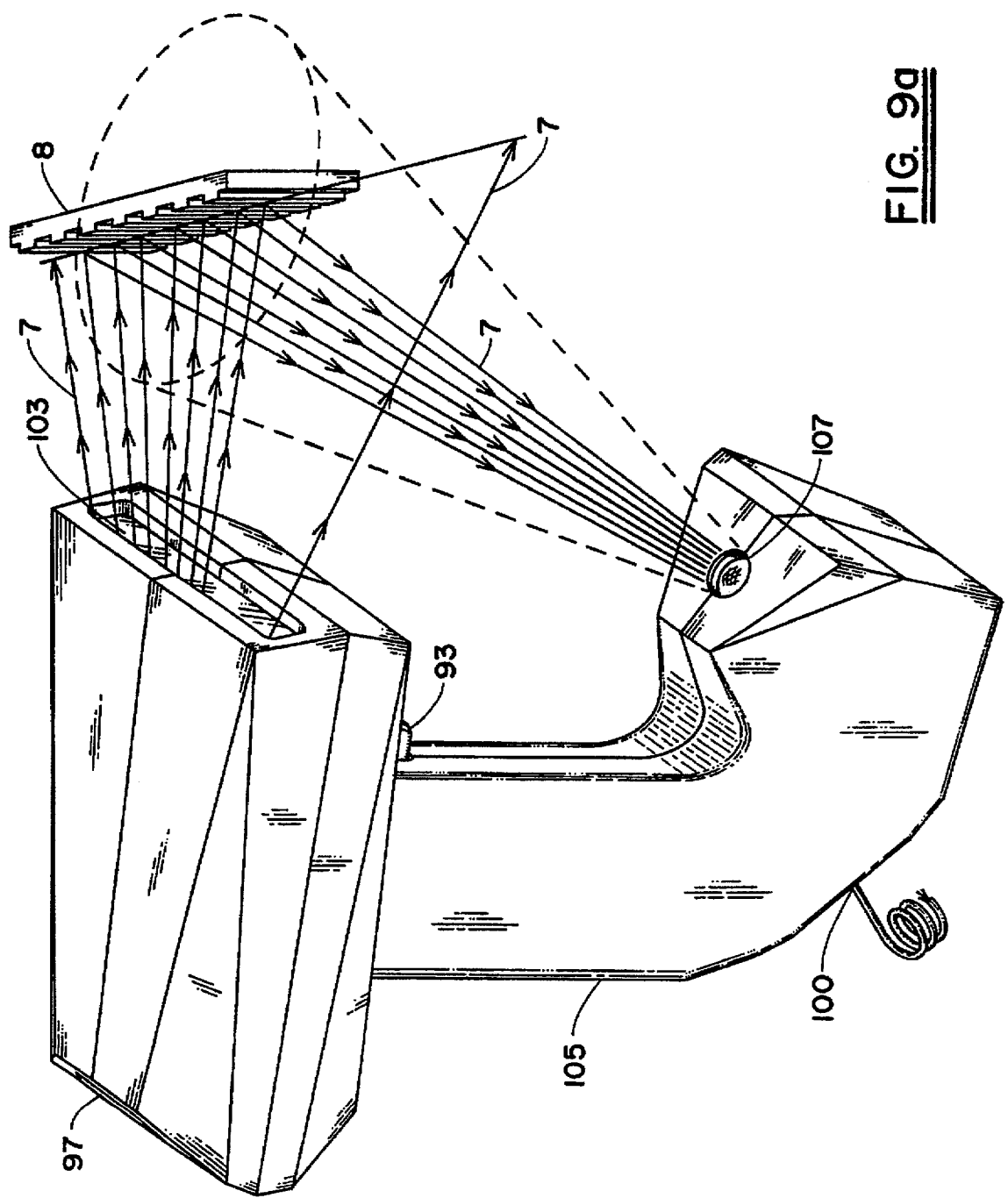

METHOD AND APPARATUS FOR NON-CONTACT READING OF A RELIEF PATTERN

CROSS REFERENCE TO RELATED APPLICATIONS

This application is a continuation-in-part of application Ser. No. 08/095,727, filed Jul. 21, 1993, now issued as U.S. Pat. No. 5,393,967.

BACKGROUND OF THE INVENTION

1. Field of the Invention

This invention relates in general to bar code scanning, and in particular to an improved method and a system for noncontact reading of product or part identification patterns. More specifically, but without restriction to the particular embodiments hereinafter described in accordance with the best mode of practice, this invention relates to optical reading of patterns which are present in relief form.

2. Description of the Prior Art

The use of bar codes for identification of parts and products is widespread. The most common means for providing an object with a bar code is to either affix a printed label, or print the code directly on the part or product. Most conventional bar code scanners require very high contrast between the bars and the background in order to properly read the code. In some cases, however, affixing a label or painting a code is either impractical or too expensive. For example, some surfaces will not allow labels to adhere properly or the presence of a label may interfere with the proper operation of the part.

One way to overcome the limitations of bar code labels and painted bar codes is to have the code set in relief on the surface of the object. This can be done by stamping, engraving, etching, milling, molding, or by other methods. The codes can be raised from the surface or can be depressed from the surface. The primary problem with such relief bar codes is that they cannot be read by currently available non-contact scanning techniques, since the contrast between the high and low parts of the pattern is generally very low.

SUMMARY OF THE INVENTION

It is therefore a primary object of the present invention to provide an improved method and apparatus for reading and decoding relief patterns using non-contact techniques.

Another object of this invention is to cull the signal data received by the receiver such that only those pixels surrounding the line of light are selected for signal processing.

Still another object of the present invention is to provide an analog processing means for amplifying and shifting the output level of the signal data.

Yet a further object of the present invention is to digitize the amplified and shifted signal data.

An additional object of the present invention is to employ a trigger switch to initiate bar code scanning.

Still yet a further object of the present invention is to utilize a video black clamping means for adjusting the level of the video signal to match the range of the analog to digital converter.

These and other objects of the present invention are attained by a non-contact apparatus for reading a surface that has information encoded in a relief pattern thereon, the relief pattern having relatively raised and recessed portions. The apparatus comprises an optical transmitter for projecting a line of light onto the relief pattern at a first angle to a normal of the surface. The present apparatus further includes an optical receiver that views the projected line of light at a second angle to the normal of the surface and produces signal data that is representative of an image of the reflection thereon. The image incorporates apparent displacements of the line of illumination that occur at transitions between raised and recessed portions of the relief pattern therealong. The signal data is culled such that only those pixels surrounding the line of light are selected. The culled signal data is then decoded into electrical signals which represent decoded information contained in the relief pattern.

In accordance with one aspect of the invention the optical receiver, the optical transmitter, the means for culling and decoding the signal data are contained within a portable hand-held unit. Power management circuitry is employed to enable battery-powered operation of the unit. A black clamping circuit is utilized for adjusting the level of the video signal to match the range of the analog to digital converter. The black clamping circuit is implemented as a charge or discharge pulse across a capacitor.

According to another aspect of the invention the black clamping circuit is implemented as a digital to analog converter.

In accordance with an alternate embodiment of the present invention, the optical transmitter means, the optical receiver means, the means for culling, and the means for decoding are contained in a fixed mount unit.

BRIEF DESCRIPTION OF THE DRAWING

For a better understanding of these and other objects of the present invention, reference is made to the detailed description of the invention which is to be read in conjunction with the following drawings, wherein:

FIG. 5a is an enlarged fragmentary perspective view of FIG. 5 taken on line 5a–5a;

FIG. 9a is a perspective view of the portable hand-held apparatus of FIG. 9.

DESCRIPTION OF THE PREFERRED EMBODIMENTS

Figure 1:
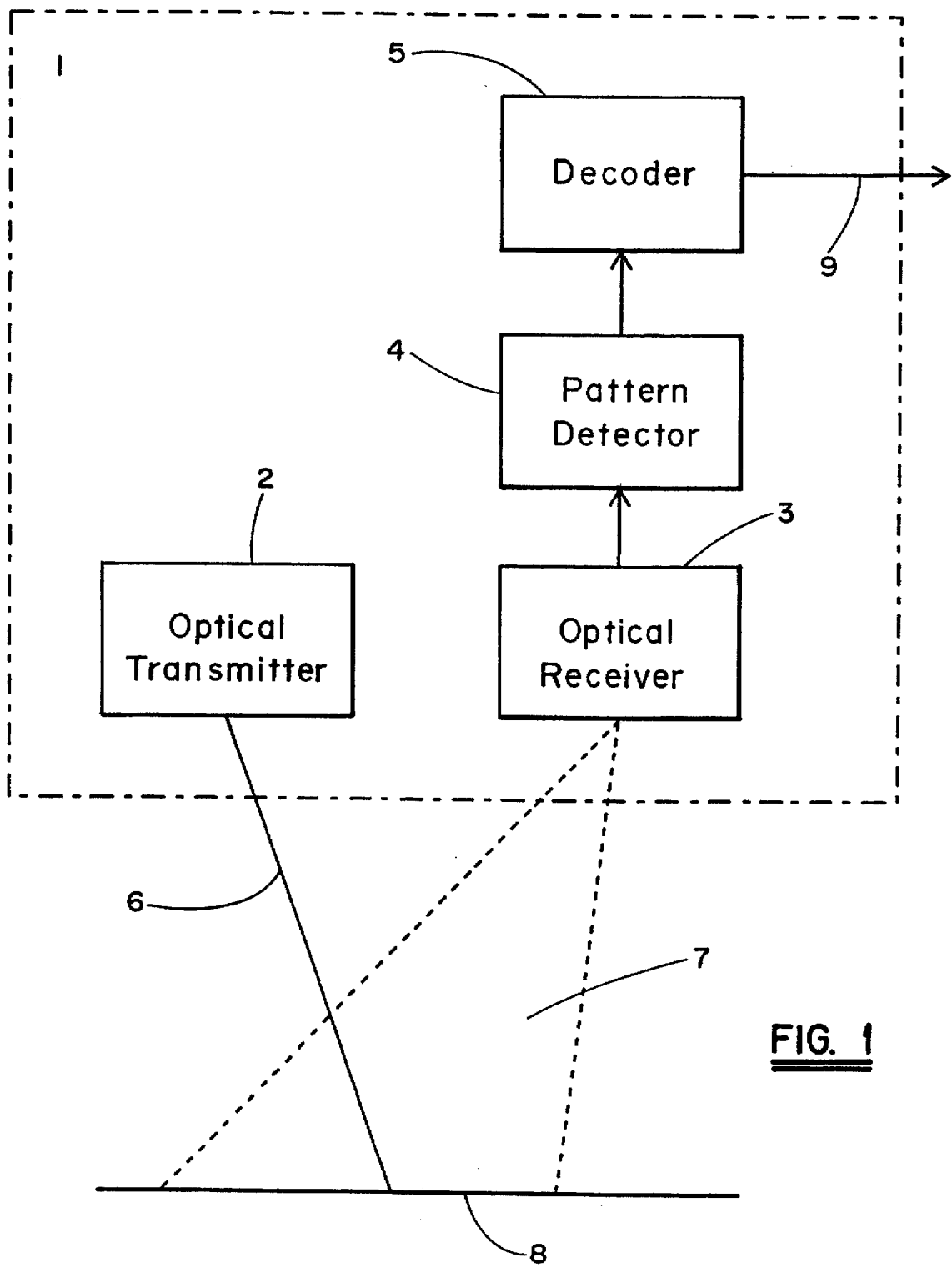
FIG. 1 is a block diagram of a relief pattern reading apparatus in accordance with the invention.

With reference now to the drawing and in particular to FIG. 1, there is depicted a representation of a relief pattern reading apparatus 1, in accordance with a preferred embodiment of the invention, positioned near an object surface containing a relief pattern 8. The relief pattern reading apparatus 1 includes an optical transmitter 2, an optical receiver 3, a pattern detector 4, and a decoder 5. A preferred embodiment of the present invention may be implemented with the components 2, 3, 4, 5 in a single unit, or with any or all of the components 2, 3, 4, 5 in separate enclosures or housings.

The optical transmitter 2 emits a beam of light 6 which impinges on the object surface containing the relief pattern 8. The beam of light 6 emitted from the optical transmitter 2 can be either a spot beam which is swept or scanned, or the beam of light 6 may be a stationary beam. In either case, the beam, if projected onto a flat surface, would appear as a line of light. Alternate methods of illuminating the surface are shown respectively in FIGS. 2 and 3, wherein the light beams are diagrammatically shown as originating from a source in the optical transmitter 2, the structural details of which have been omitted for clarity.

Figure 2:
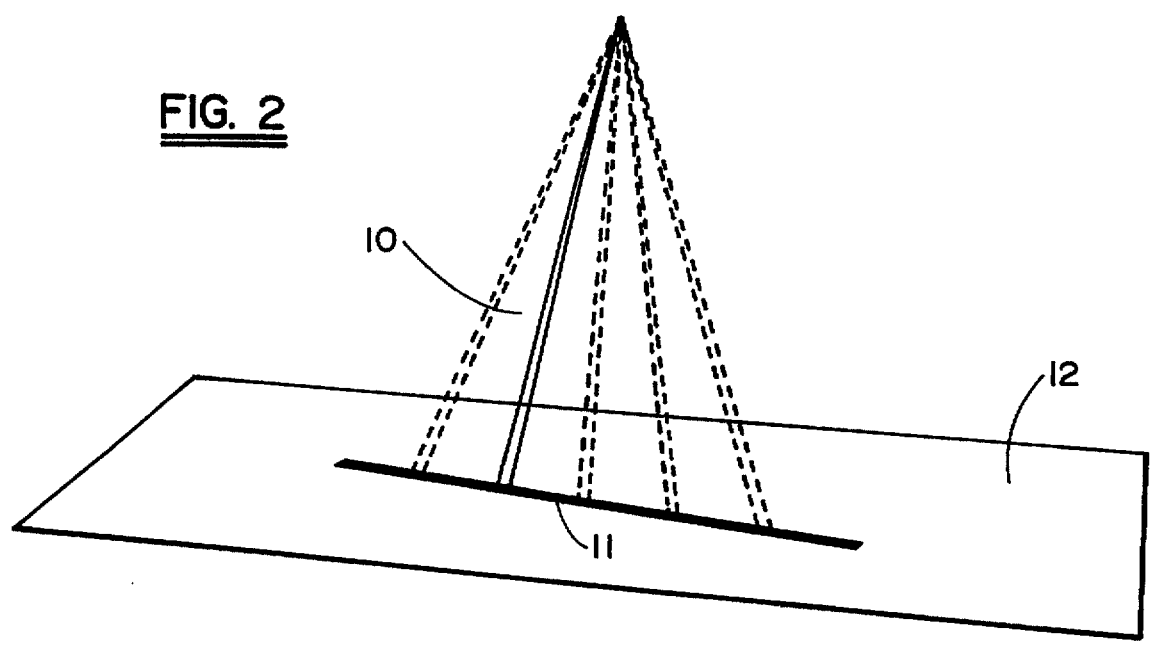
FIG. 2 is a perspective pictorial view of a swept column beam of light impinging on a flat surface.

In FIG. 2 there is depicted a spot beam of light 10, which is swept or scanned to form a line 11 when projected onto a flat surface 12. Representative positions of the beam 10 as the spot moves across the surface are indicated by the series of dotted lines in FIG. 2.

Figure 3:
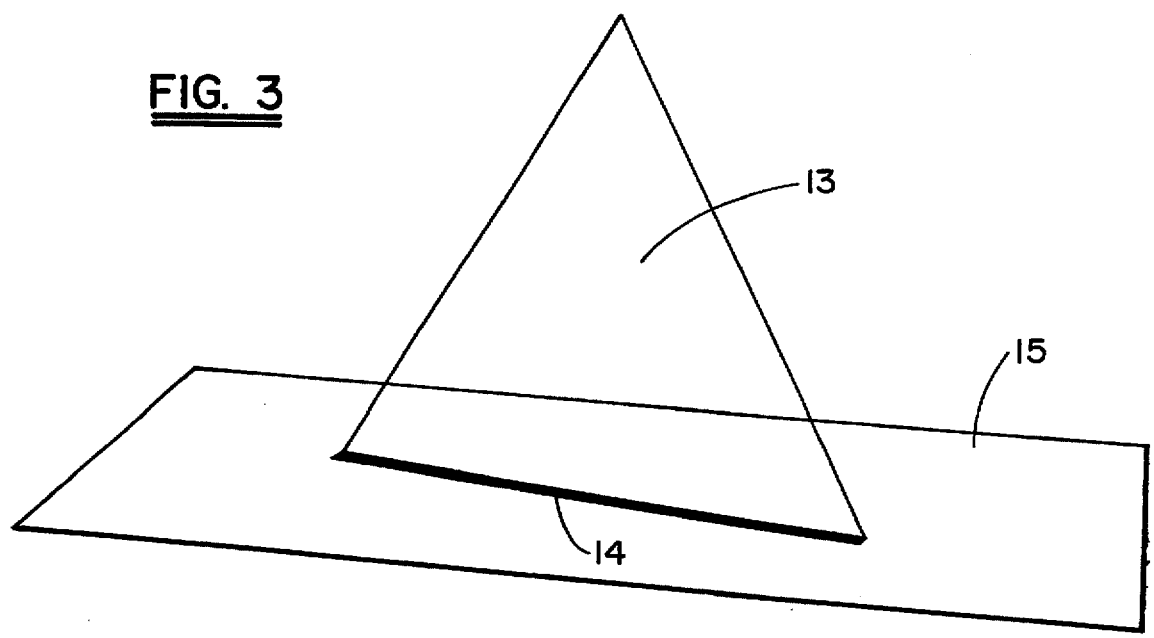
FIG. 3 illustrates a fan beam of light impinging on a flat surface.

Referring to FIG. 3, there is depicted a fan beam of light 13, which forms a line 14 when projected onto a flat surface 15.

Turning again to FIG. 1, the optical receiver 3 is positioned such that its field of view 7 contains the projected image of the line of illumination produced by the beam of light 6 on the surface 8. The optical receiver 3 converts the image in its field of view 7 into electrical signals which can be processed by the pattern detector 4. The pattern detector 4 extracts the coded pattern from the electrical representation of the image and sends the coded pattern to the decoder 5 for decoding. This representation may be a digitized signal as is known to the decoding art, or could be in other well known formats. The decoder 5 decodes the coded pattern to extract the character string or other information which was encoded into the relief pattern. The decoder 5 uses techniques well known in the art to decode the coded pattern, and as such is not a subject of the present invention. The decoder 5 outputs the decoded character string or information to a display or similar conventional device using a communications port 9. The communications port 9 may take many forms and is also not a subject of the present invention.

Figure 4:
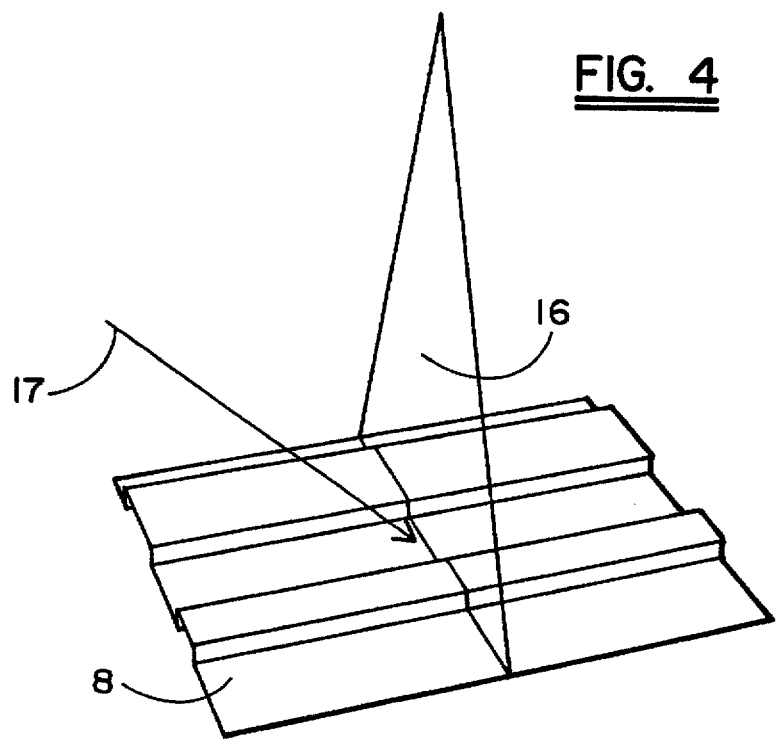
FIG. 4 is a perspective pictorial view of a swept column or fan of illumination impinging on a relief patterned surface.

In order for the components in FIG. 1 to be utilized in reading relief patterns, the optical transmitter 2 must be separated from the optical receiver 3 by some distance. Referring to FIG. 4, the swept spot or fan illumination 16 generated by the optical transmitter 2 impinges upon the relief pattern 8 forming what appears from the viewpoint of the optical transmitter 2 to be a straight line. The optical receiver 3 is positioned such that its direction of view 17 is as shown in FIG. 4.

Figure 5:
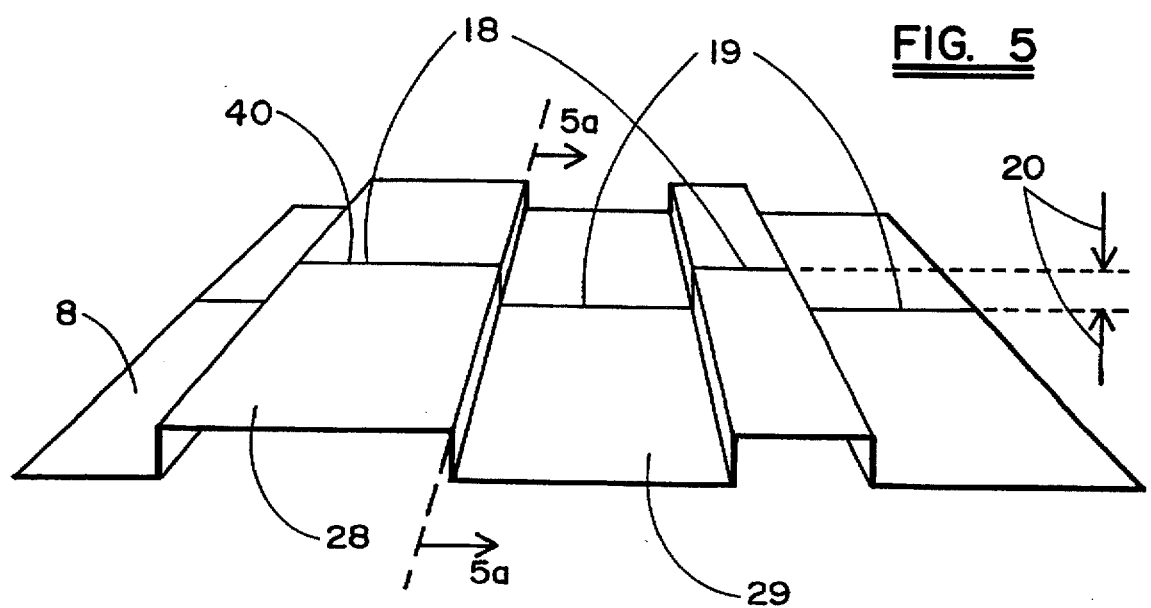
FIG. 5 is an enlarged perspective view of a surface bearing a relief pattern which has been exaggerated for clarity to illustrate parallactic displacements of a line of illumination.

FIG. 5 depicts the image of the relief pattern surface 8 as seen from the point of view of the optical receiver 3. Because of the separation of the optical transmitter 2 and the optical receiver 3, those portions of the illuminated surface 8 which are on the raised portions of the pattern exhibit a parallactic displacement 20 from those portions of the illuminated surface 8 on the lower portions of the pattern. It is this parallactic displacement 20 which is detected by the pattern detector 4.

Figure 5A:
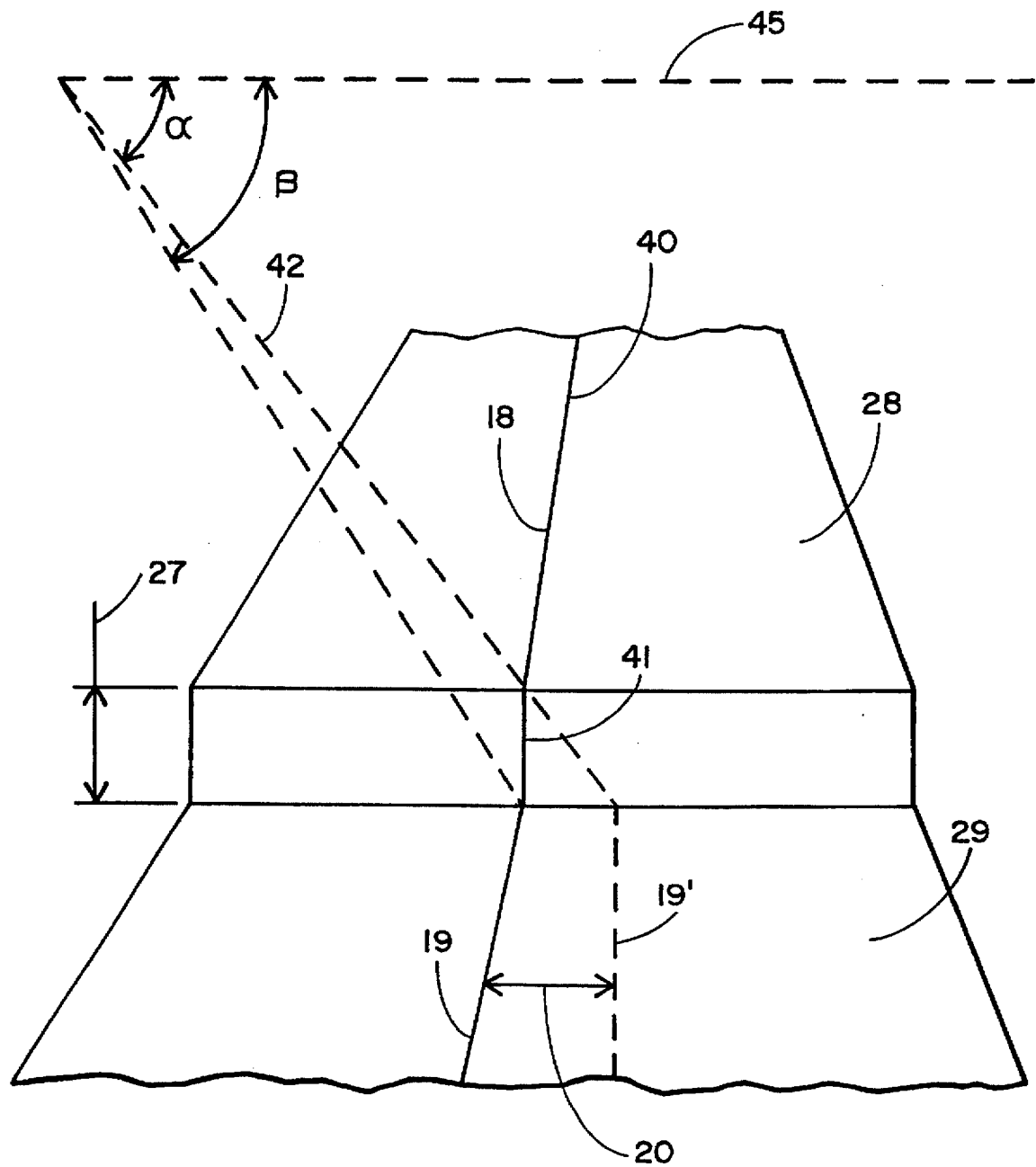

In order to better understand the apparent displacement of the line of illumination along the relief pattern it will be helpful to refer to FIG. 5a, in which a line of illumination 40 has a segment 18 that crosses a raised zone 28 of the relief pattern, and a substantially vertical segment 41, representing a transition between raised portion 28 and a recessed zone 29. Line 40 continues horizontally along recessed zone 29 as a segment 19. An angularly displaced observer, such as optical receiver 3 in FIG. 1, views the relief pattern along line 42. Such an observer would perceive segment 18, and a segment 19' (shown as a dotted line in FIG. 5a) as collinear, as the angular displacement α of these segments from the observers' optical axis 45 is identical. Dotted line 19' of course is not actually part of the line of illumination. This observer perceives segment 19, the actual line of illumination, as being displaced a distance 20 from segment 18, a phenomenon referred to herein as parallactic displacement. It will be evident that the degree of parallactic displacement is a function of the difference between the angular displacement β of segment 19 and the angular displacement α of segment 18. This angular difference is affected by the distance between the relief pattern and the observer and of the dimension 27 that represents the relative difference in elevation of zones 28 and 29.

While the above explanation assumes a substantially vertical illuminating beam and an angularly displaced observer, the optical transmitter and receiver can be exchanged. An angular displacement of approximately equal magnitude but of opposite direction will result. Neither component need be vertical.

Figure 6:
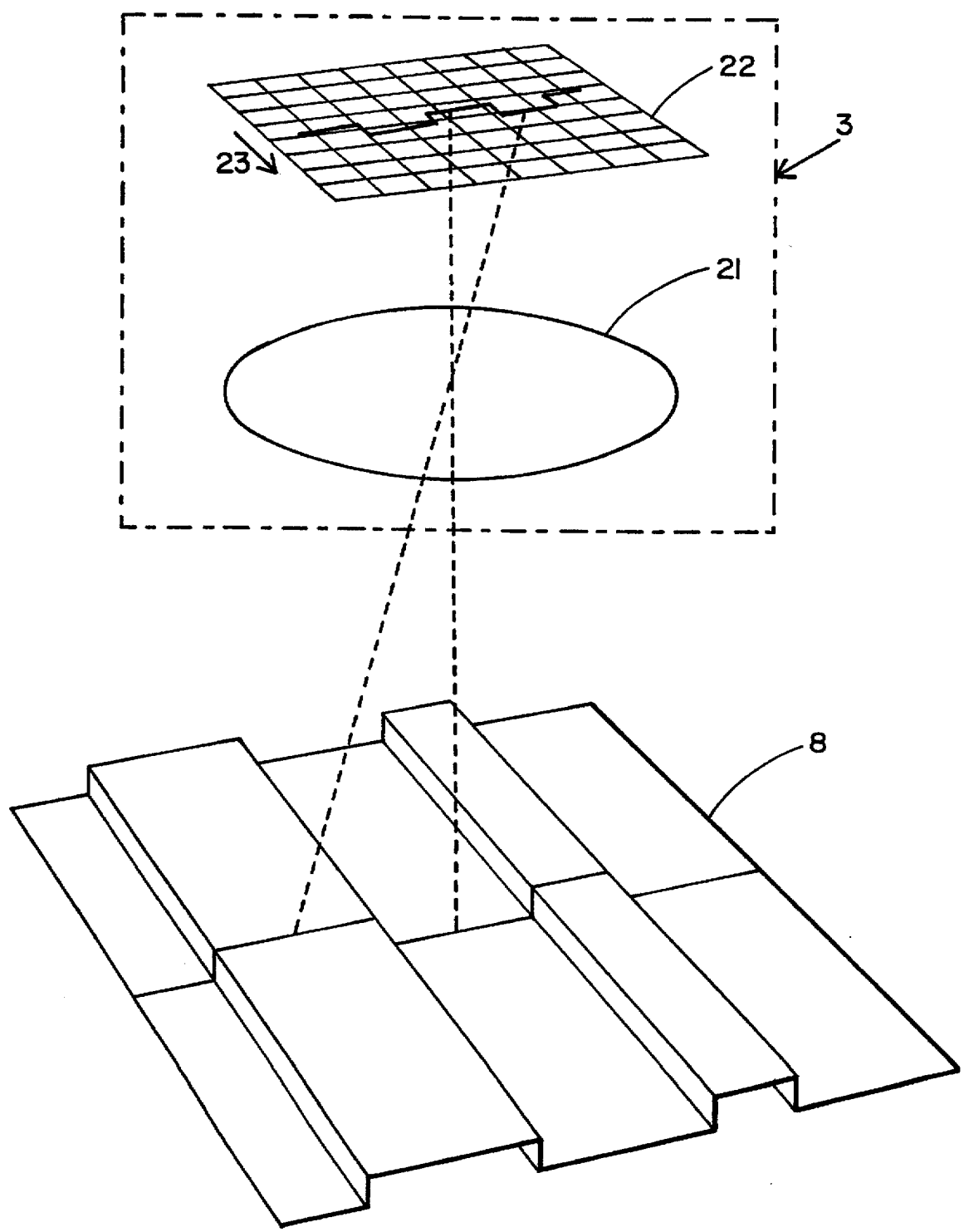
FIG. 6 is a diagram that illustrates a mapping of an image of the line of illumination on the surface shown in FIG. 5 onto a two-dimensional photodetector array in an optical receiver.

The optical receiver 3 can be constructed using either a linear array of photodetectors or a square or rectangular two-dimensional array of photodetectors. Any conventional photodetector array such as a charged coupled device or CCD array is suitable. Referring now to FIG. 6, optical receiver 3, schematically enclosed by the dashed line, comprises imaging lens 21 and two-dimensional array of photodetectors 22. Imaging lens 21 collects light from the illuminated portions of surface 8, and focuses the light to form an image on the two-dimensional array of photodetectors 22. The parallactic displacement 20 is translated by imaging lens 21 into a displacement in the direction arrow 23 on the two-dimensional array of photodetectors 22. This image containing the displacement is translated by the two-dimensional array of photodetectors 22 into an electrical representation of the image which is sent to the pattern detector 4 for further processing. This optical receiver configuration can use either a swept spot beam or a fixed fan beam implementation of the optical transmitter 2.

Figure 7:
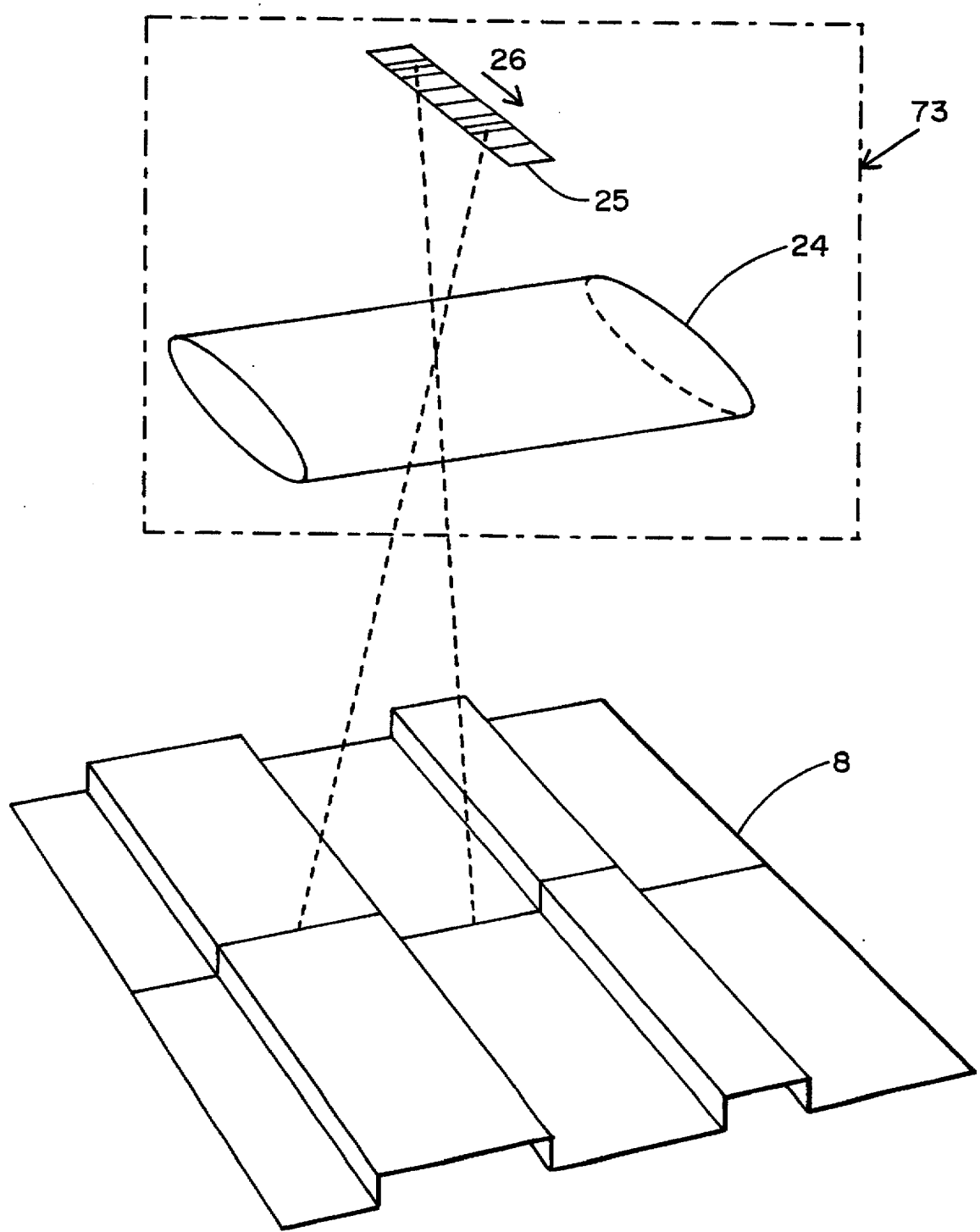
FIG. 7 diagrammatically illustrates a mapping of an image of a line of illumination generated by sweeping a beam of light across the surface shown in FIG. 5 onto a linear photodetector array.

FIG. 7 depicts an alternative embodiment of the optical receiver 3 in accordance with this invention. In this preferred embodiment, optical receiver 3 comprises a lens system 24, which can be a cylindrical lens, and a linear array of photodetectors 25. This embodiment requires the use of the swept spot beam implementation of the optical transmitter 2. The lens system 24 focuses light from the relief surface onto the linear array 25 such that each element or cell of the linear array 25 collects light from an area of the surface that is approximately parallel to the direction of the illuminating beams' image. The parallactic displacement 20 is therefore translated by the lens system 24 into a displacement on the linear array of photodetectors 25 in the direction of arrow 26. At any point along the sweep of the spot beam, the photodetector cell with the highest intensity corresponds to the position of the surface that the spot beam is incident upon. The optical receiver 3 in the embodiment shown in FIG. 7, generates an electrical representation of the current position of the spot which, when sampled over the entire sweep of the spot, directly indicates the relative height of the relief at each sample point. This information is sent to the pattern detector 4 for further processing.

Decoder 5 and pattern detector 4 are known in the art and will not be discussed further herein.

Figure 8:
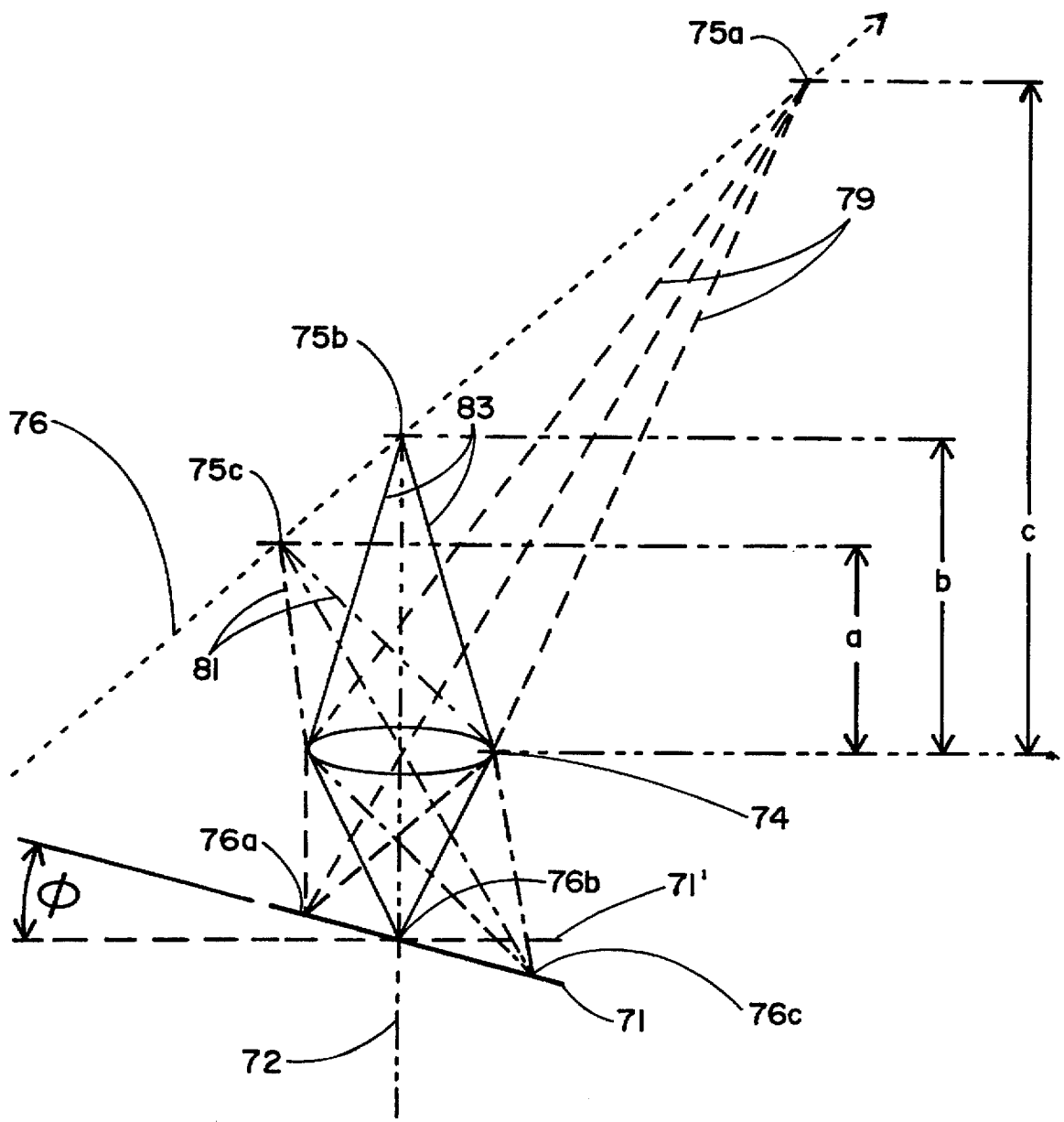
FIG. 8 schematically illustrates an alternate optical arrangement for mapping the image onto the photodetector array of FIGS. 6 and 7.

In FIG. 8 there is shown an alternate embodiment of the arrangement of FIGS. 6 and 7. A lens system, shown as lens 74 has an optical axis 72. The lens system can be a single element, or can be a combination as is appropriate for a given application. An image plane 71' is defined which is substantially normal to the optical axis 72. Individual surfaces being scanned by the system have a bar coded symbol thereon, possible locations of which are indicated by lines 75a–75c. The remainder of the surfaces on which the bar code symbols are located have been omitted for clarity. It is understood that while three bar code symbol locations from three different surfaces are illustrated, only one surface is scanned at any one time. The bar code symbol may be the same symbol as shown in FIGS. 6 and 7. A fan beam of light, indicated in two dimensional projection by dotted line 76, is projected, preferably by a laser, striking the surface and the bar code symbols. In general the bar code symbols being scanned will not lie on the optical axis 72, so that light rays striking points 75a–75c do not travel equal distances from the light source. Reflected light from the scanned surfaces is collected by lens 74, the principal rays being indicated by the dotted lines 79, 81 and solid lines 83, as shown in FIG. 8, and then projected generally towards a photodetector array 71 which can be linear or two-dimensional. In general, due to the variation in the positions of individual surfaces being scanned, light paths extending to the image plane 71' from points on the surfaces that lie at a constant half angle with respect to optical axis 72 vary in length. Another consequence of the positional variation in the scanned surfaces is that the planes normal to axis 72 and passing through various bar code elements being scanned, indicated as points 75a–75c, lie at different distances (shown as dimensions "a", "b" and "c" respectively) from the lens 74. Consequently the image plane 71' does not include all the images 76a, 76b and 76c of points 75a, 75b, and 75c respectively, but can include at most only one of them, here shown as point 76b. The photodetector array 71 is tilted from the normal of optical axis 72 at a tilt angle φ, so that points 76a–76c all fall approximately on the array 71. The angle φ is readily calculated to minimize the distances of points such as 76a–76c from the actual position of array 71 using the equations of lens 74, or it may be determined empirically. Although shown for clarity as a single dotted line 76, the laser light is actually a fan beam, and the three dimensional surfaces that include points 75a–75c have been omitted for clarity. Tilting the array 71 with respect to the image plane 71' substantially increases the functional depth of field of the system. It will be apparent that points on other three dimensional surfaces (not shown) which lie intermediate points 75a and 75c will be focused on a pixel element somewhere on array 71.

Figure 9:
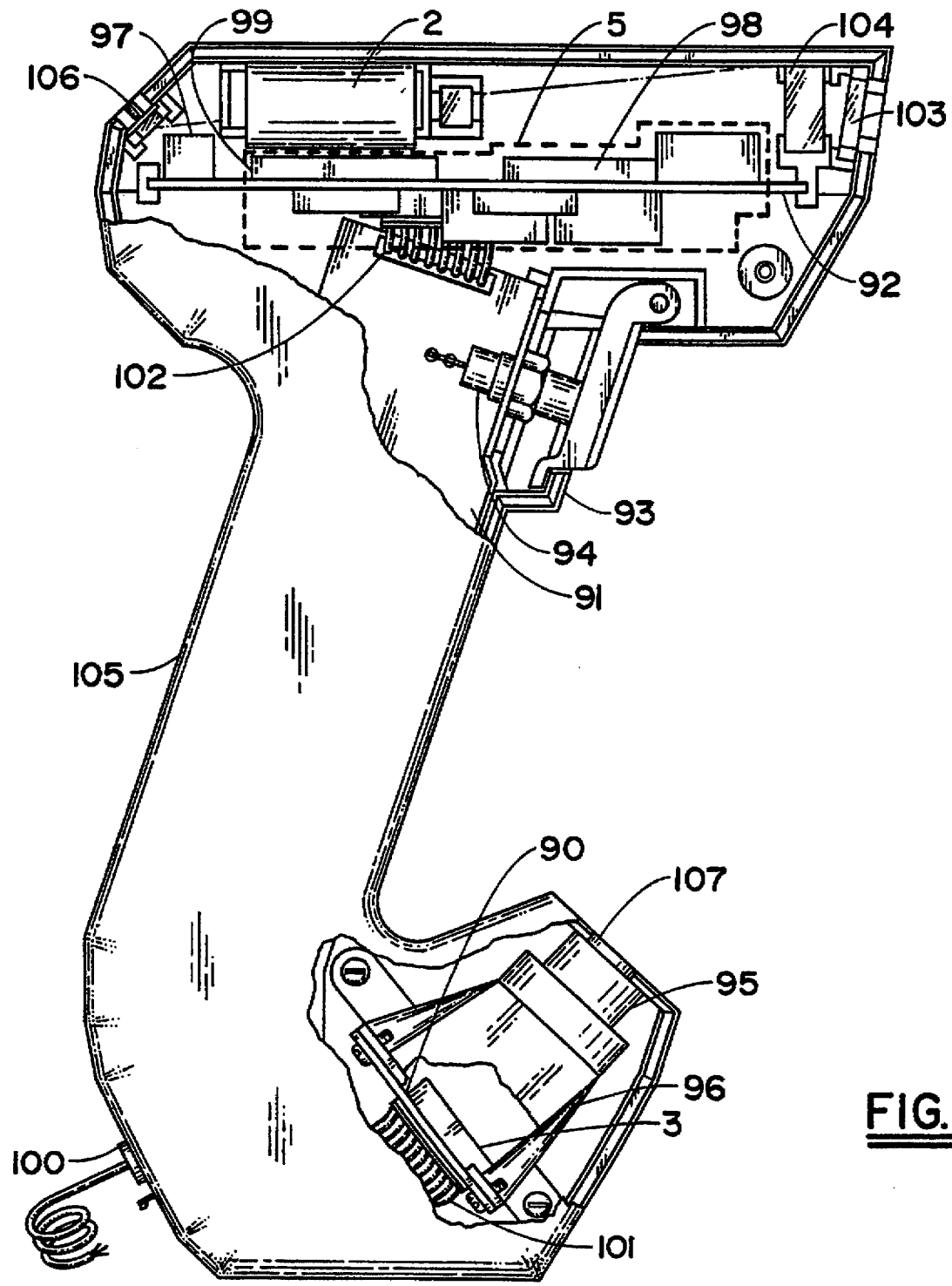
FIG. 9 is a partially broken-away elevation view of a portable, handheld apparatus according to one embodiment of the present invention.

A specific embodiment of the present apparatus is shown in FIG. 9–9a. This embodiment incorporates additional features to allow operation at higher video frame rates with lower current power supplies, such as batteries. In this embodiment of the relief pattern apparatus 1, the optical transmitter 2, the optical receiver 3, the pattern detector 4, and the decoder 5 are contained in a portable hand-held housing 105. This embodiment includes the portable, hand-held housing 105, but it can also be implemented as a fixed unit attachable to an assembly line or other manufacturing or warehousing location. The optical transmitter 2 is located at the top of housing 105 so as to make the operation of pointing the optical transmitter 2 at a sample as close as possible to that of standard barcode scanners. This embodiment shows the optical receiver 3 positioned below a hand grip 108, although it could be located in any position which allows for sufficient distance between the transmitter 2 and the receiver 3.

The optical transmitter 2 is preferably a diode laser line projector module which generates the fan beam (or sheet of light) 13 as shown in FIG. 3. The fan beam 13 passes through an optional optical element 104 which can be used to adjust the size of the emitted beam to closely match the field of view 7 of the optical receiver 3. The optical element 104 may be a lens, a system of lenses, or another optical device. The fan beam 13 then passes through a window 103, in the hand-held housing 105 and illuminates the target relief pattern 8.

The light incident on the target is scattered or reflected back to an optical receiver input window 107. The window 107 may be optically transparent or it may be an optical filter designed to allow only certain desired laser wavelengths to pass therethrough. Alternatively, a separate window and filter may be used.

The light reflected from the relief pattern 8 next enters an imaging lens or lens system 95 and is focused onto the optical receiver 3. The optical receiver 3 in this embodiment is a two dimensional CCD array 30. The output signals from this CCD array are amplified and conditioned in circuits on an analog circuit board 90 which is held relative to the imaging lens system 95 by camera assembly housing 96. The array is tilted relative to the camera centerline, as illustrated in FIG. 9–9a.

The analog conditioned signals are sent to a driver/power supply board 91 via a cable 101. The cable 101 also carries the CCD driver signals from the driver/power supply board 91 to the CCD array 30.

Figure 10:
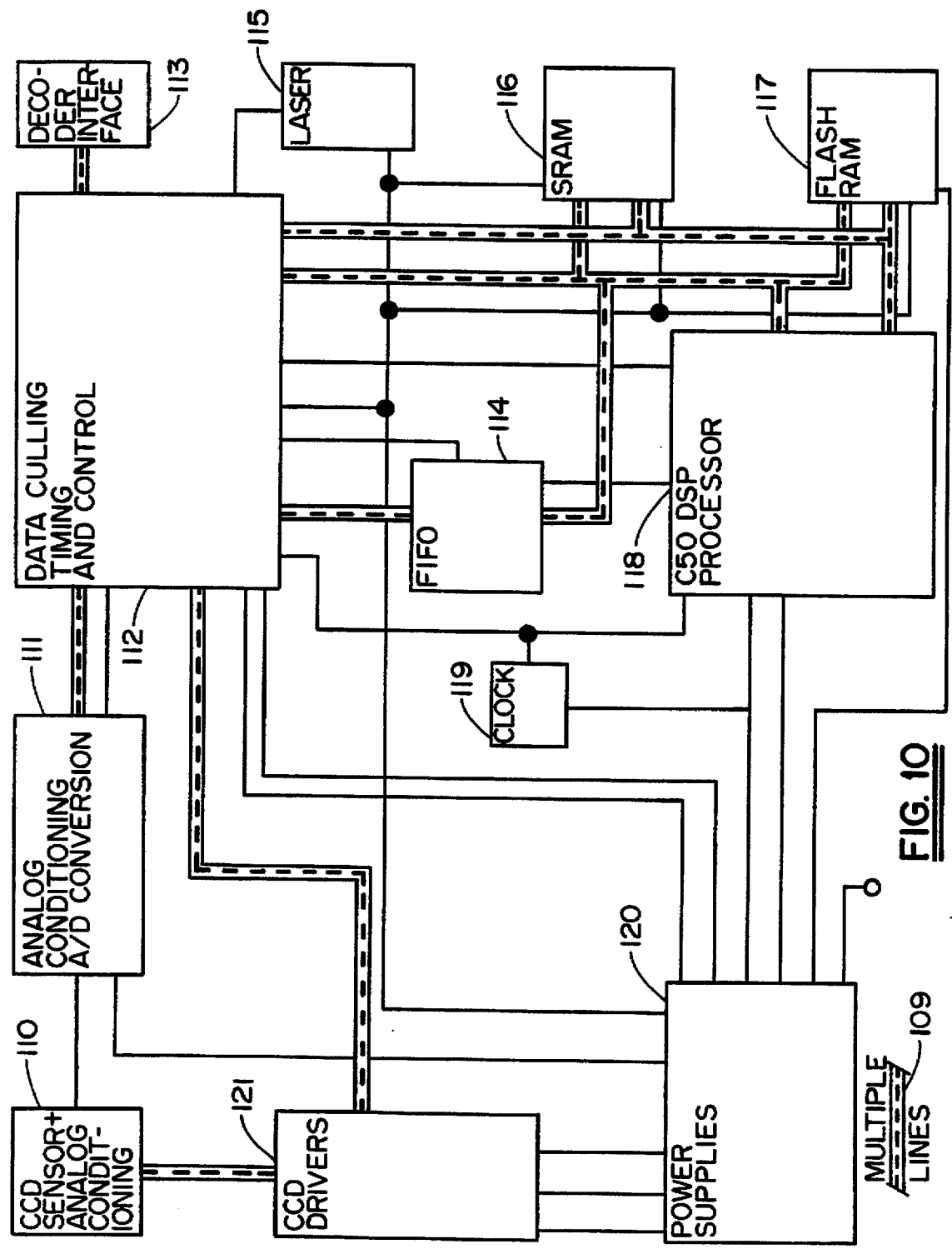
FIG. 10 is a system block diagram of the component elements of the apparatus illustrated in FIG. 9.

The driver/power supply board 91 houses CCD driver circuitry 121, analog to digital converter (ADC) and analog conditioning circuitry 111, and power supply circuitry 120 as illustrated in FIG. 10. An input/output (I/O) cable connector 100 is also mounted on the circuit board 91.

A trigger 93 and trigger switch 94 are mounted in the housing 105 and connect to the driver/power supply circuit board 91. A digital interface cable 102 carries signals and power to and from a digital circuit board 92. The digital circuit board 92 includes a digital processor 98, a logic array 99, and some indicator lamps 97. The indicator lamps 97 provide the user with system status information.

FIG. 9a is a perspective view of the portable, hand-held apparatus in operation. Optical transmitter 2 transmits a line of light onto the relief pattern 8 through the window 103. The reflected light from the relief pattern 8 is then received by optical receiver 3 through the optical receiver input window 107. The optical transmitter 2 directs the line of light in the field of view 7.

FIG. 10 is a block diagram of the embodiment of the present invention illustrated in FIG. 9. In the diagram of FIG. 10, the double solid lines indicate signal flows which are composed of multiple signals. The single solid lines indicate signal flows which are composed of a single signal.

The CCD array 30 is included in CCD sensor and analog conditioning circuitry 110. The CCD array 30 produces an analog signal or signals which are connected to the analog conditioning and A/D conversion circuit 111. The conversion/conditioning circuit 111 provides gain and offset adjustment, multiplexing, black level clamping, and analog to digital conversion. The controls for the conversion/conditioning circuit 111 are provided by a data culling, timing, and control circuit 112.

The data culling, timing and control circuit 112 provides timing and control signals for the conversion/conditioning circuit 111 and for the CCD drivers circuit 121. The circuit 111 also provides bus control for a processor 118, a "first-in, first-out" or FIFO 114, a static random access memory or SRAM 116, and a flash RAM 117. Additionally, the data culling, timing, and control circuit 112 provides control signals for the power supplies 120, a laser 115, and a decoder interface 113. One important function of the circuit 112 is to provide preprocessing of the digitized data generated by the conversio/conditioning circuit 111.

The data output from the data culling, timing and control circuit 112 is fed into the FIFO circuit 114, for temporary storage.

The processor 118, provides signal processing, data processing, and control functions for the system. The software to operate the processor is stored in the flash RAM 117. Data storage for the processor is provided by the optional SRAM 116. A processor clock signal is provided by clock circuit 119.

The CCD driver circuit 121, converts TTL level signals from the data culling, timing and control circuit 112 to the voltage levels required by the CCD array 30. The various voltages used by the driver circuit 121 are provided by the power supplies 120. The output of the system is a serial signal which is generated by the processor 118 and presented to the decoder 5 via the decoder interface 113.

In order to minimize the power used by the system, various power signals are switched off when not in use and on again when required. During idle periods, when the trigger 93 is not pulled, and when scanning is not being requested by the decoder 5, power is only applied to a few key components, such as the power supplies circuitry 120 and part of the decoder interface 113. When the trigger 93 is pulled or scanning is requested, the processor 118, clock 119, FIFO 114, SRAM 116, flash RAM 117, laser 115, and data culling, timing, and control circuitry 112, are powered up. Once these circuits are powered up, tested and configured by the processor 118 the conversion/conditioning circuitry 111, the CCD driver circuit 121, and the CCD array 30 of the CCD circuit 110 are powered up. When all processing is complete, the power supplies 120 once again return to the idle state. Other embodiments are possible switching different supplies at different times.

Figure 11:
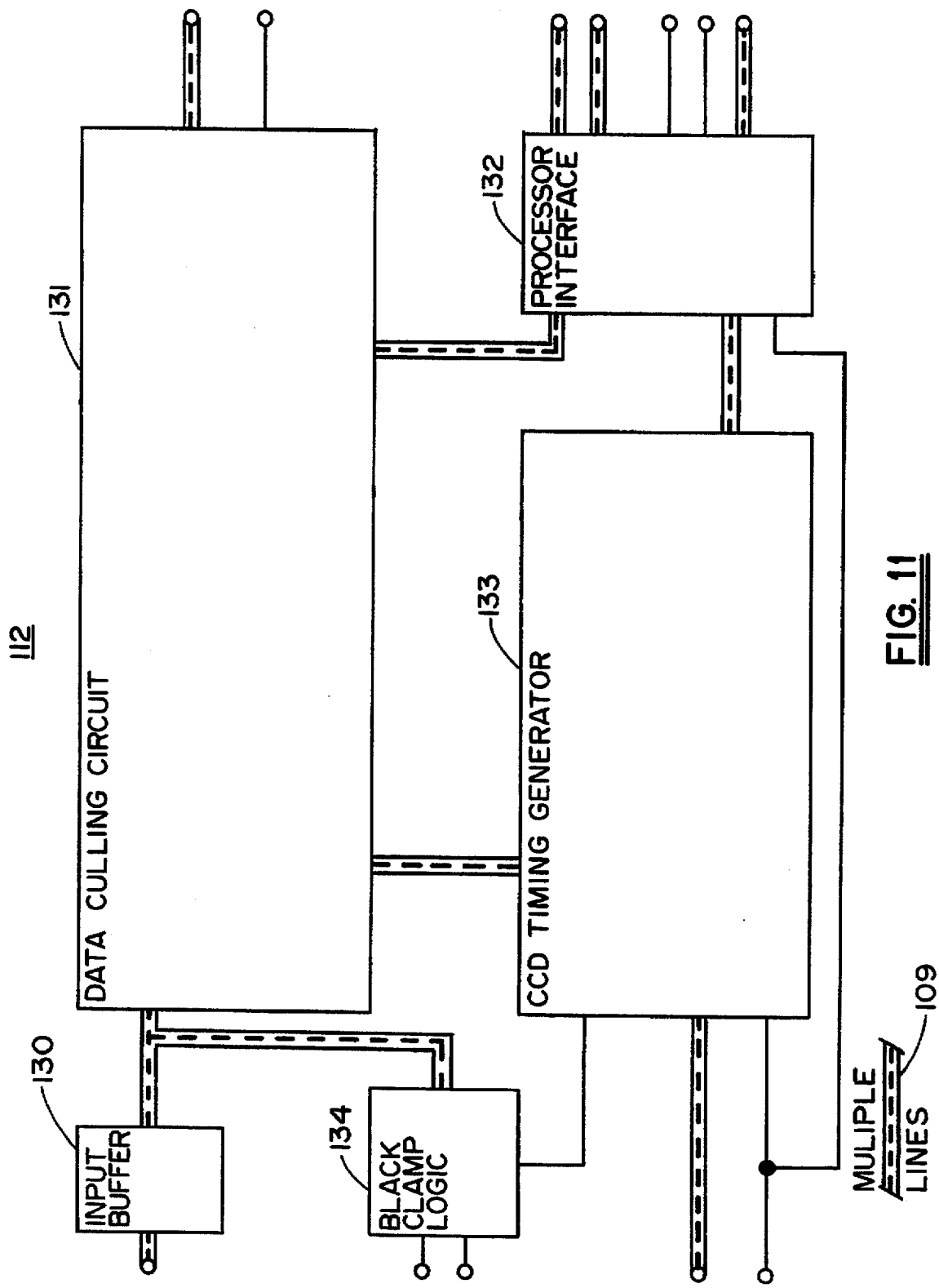
FIG. 11 is a detailed block diagram of the data culling, timing, and control circuit of the apparatus shown in FIG. 9.

FIG. 11 is a detailed block diagram of the data culling, timing, and control circuit 112. In the present embodiment, this function is contained in a field programmable gate array, but it could be implemented in an application specific integrated circuit (ASIC), a processor, such as a digital signal processor, discrete logic, or any other logic device or combination of logic devices. Among the most important and novel aspects of this invention is the use of this circuit to reduce the amount of data that must be processed by the processor. The design of data culling, timing, and control circuit 112 takes advantage of the fact that the part of the video image that must be processed is only a small part of the entire video image. A data culling circuit 131 discards the majority of the video data and captures only the portions of the video around image of the laser line. This reduces the amount of data that must be processed by the processor 118 by a factor of about sixty to one. It also eliminates the need for the processor 118 to search through the data looking for possible peaks, further reducing the processing requirements of the system.

The following is an example of an image of a line of light in a CCD array. Each number represents an intensity of a pixel in the array. This array is 12×12 array for simplicity.

| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |
| 0 | 0 | 0 | 0 | 0 | 30 | 30 | 0 | 0 | 0 | 0 | 0 |

This represents a clear image of a line of light that is two pixels wide with excellent contrast. The intensity of the background level (0) is very low compared to the intensity of the image of the line of light (30).

The following is an example of a CCD array receiving a low contrast image.

| 8 | 9 | 8 | 9 | 12 | 18 | 28 | 11 | 7 | 7 | 9 | 8 |
| 7 | 8 | 8 | 7 | 11 | 19 | 25 | 13 | 9 | 7 | 8 | 7 |
| 7 | 8 | 9 | 9 | 13 | 20 | 24 | 14 | 8 | 7 | 8 | 8 |
| 8 | 7 | 8 | 10 | 11 | 18 | 28 | 13 | 7 | 8 | 7 | 9 |
| 7 | 9 | 8 | 7 | 12 | 19 | 27 | 11 | 8 | 7 | 8 | 8 |
| 9 | 7 | 9 | 7 | 12 | 17 | 26 | 13 | 7 | 8 | 7 | 7 |
| 8 | 8 | 8 | 8 | 14 | 16 | 27 | 14 | 9 | 7 | 8 | 8 |
| 7 | 7 | 8 | 9 | 13 | 18 | 28 | 12 | 8 | 8 | 7 | 8 |
| 9 | 7 | 9 | 10 | 12 | 20 | 25 | 11 | 7 | 7 | 9 | 7 |
| 8 | 8 | 8 | 9 | 12 | 19 | 26 | 15 | 8 | 8 | 8 | 7 |
| 7 | 8 | 9 | 9 | 11 | 18 | 27 | 12 | 9 | 7 | 7 | 8 |
| 8 | 7 | 8 | 9 | 14 | 18 | 26 | 12 | 7 | 8 | 8 | 7 |

The contrast between the intensity of the background light and the intensity of the image of the line of light is much lower than in the previous table. The present invention handles this low contrast condition through its culling means.

With continued reference to FIG. 11, the data from the analog to digital converter (ADC) in conversion/ conditioning circuitry 111 is latched each clock cycle by the input buffer 130. This input data is passed to both the data culling circuit 131 and a black clamp logic circuit 134. The black clamp logic circuit 134 is used to adjust the analog levels of the input signal such that the black reference pixels in the CCD image generate a specified ADC level. The data culling circuit 131 examines the input data stream and detects pixels which appear to contain the laser line image. When the laser line image is detected, the data culling circuit 131 writes data into the FIFO 114 via FIFO data and FIFO control lines. The data consists of an identification word which indicates that a pixel packet is being output, followed by row, column, background estimate, and the actual pixel data values. In addition, the data culling circuit 131 outputs data indicating when a horizontal sync occurs, and when a vertical sync occurs. The data culling circuit 131 generates these different output packets based on the input data and timing control data provided by a CCD timing generator 133. The data culling circuit 131 can be operated in a number of modes, including a normal operational mode as described above, a bypass mode where all data latched at the input is passed along to the FIFO for debug and test purposes, a test mode where data is generated in an internal test data generator built into the data culling circuit and lastly, an "output gated off" mode where data is blocked from being sent to the FIFO. The control of these modes is provided by registers in a processor interface 132. The state of bits in these registers are used to enable and disable various functions of the logic array. In addition, the processor interface 132 provides bus decode signals for the various circuits attached to the processors address and data buses. The processor interface 132 also provides input and output for the processor 118 for controlling the decoder interface 113 and indicator lamps 97.

The CCD timing generator 133 provides all of the timing signals and functions required for the CCD array 30, driver circuit 121 which include serial and parallel clockout signals and timing for the CCD array 30, exposure timing, ADC clocking, black clamp timing, data culling timing, horizontal sync, vertical sync. The CCD timing generator 133 also provides timing for the data culling circuit 131 and the black clamp logic 134. The CCD timing generator 133 is controlled by signals from the processor interface 132.

Figure 12:
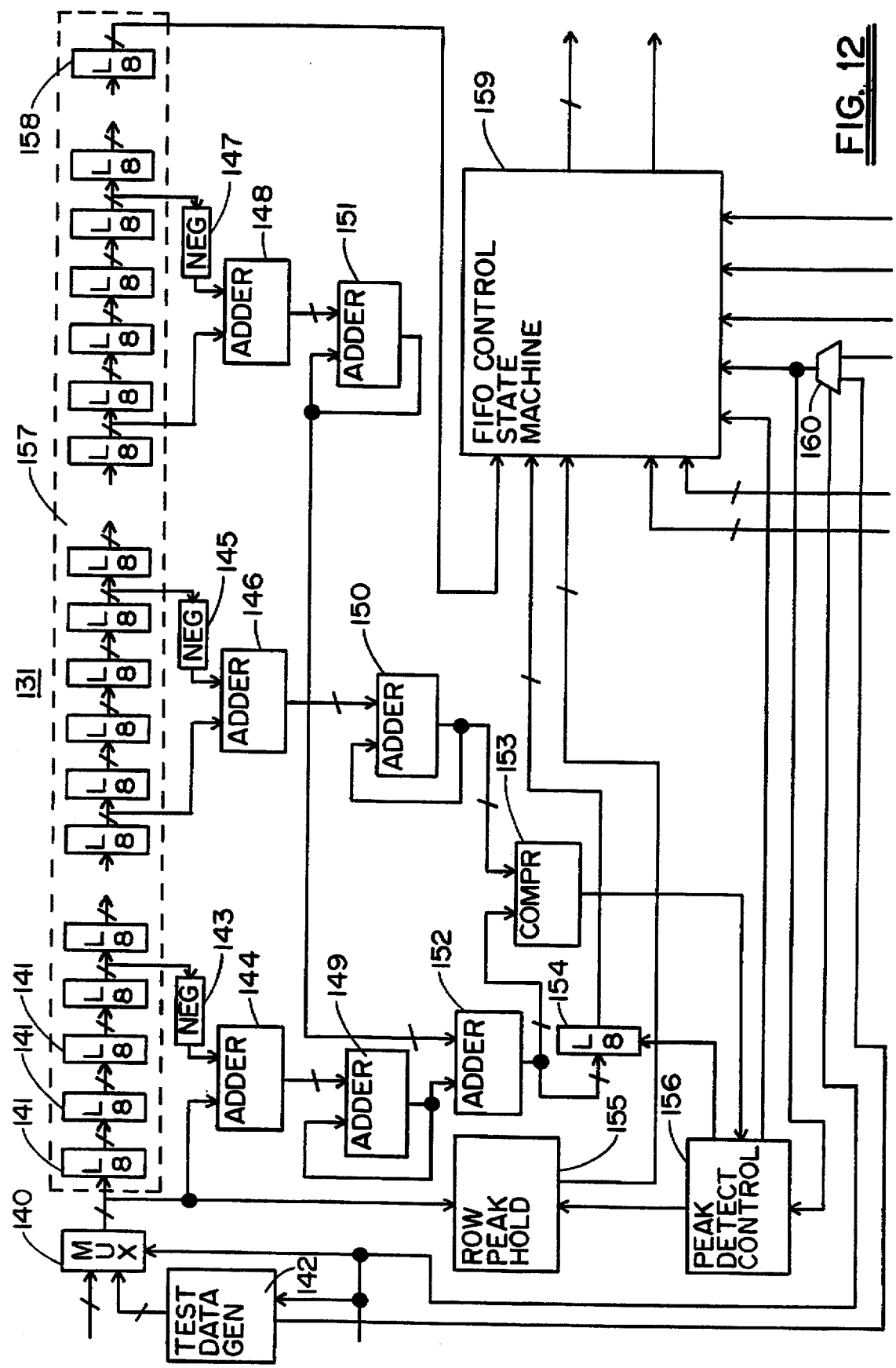
FIG. 12 is a detailed block diagram of the data culling circuit illustrated in FIG. 11.

Referring now to FIG. 12, there is shown a detailed block diagram of the data culling circuit 131. The input data from the ADC is fed to a shift register array 157, via a multiplexer 140. The shift register array 157 is composed of a series of latches 141 which are all clocked by a common clock signal. On each clock rising edge, the contents of each latch 141 is transferred to the adjacent latch to the right. As a result, a data value which initially enters the array from the multiplexer 140 moves through array from left to right, one latch per clock, until the data value arrives at a rightmost latch 158. Thus, if there are N latches in the array, then the array will contain the last N data values presented to the array.

Detection of the laser line is accomplished by the shift register array 157 and associated arithmetic components. As data is shifted into the shift register array 157, an adder 144 computes the difference between the values entering and leaving the first four latches of the array. An adder 149 accumulates these differences. All of the adders in the diagram of FIG. 12 are registered adders. A registered adder conventionally is an adder which has an output register to capture the sum of the adder on a clock edge. The configuration of each of the adders 149–151 connects one of the inputs of the adder to the output of the adder, so that at each rising edge of the clock, the output is added to the other input and latched in the adder's register. Thus, the output of adder 149 is the sum of the values in the latches between the two points in the shift register array 157 where adder 144 and a twos complementer 143 are connected. An alternate embodiment would replace the twos complementer 143 with an 8bit inverter and would force a logic "one" into the carry input of the adder 144. The output of the adder 149 is used as an estimate of the background level on one side of the pixels being checked for the presence of the laser line. An adder 148, a twos complementer 147, and an adder 151 perform the same function as performed by adder 144, twos complementer 143, and adder 149, except that they compute the sum of the latch values in a shift register 157 between the connection of adder 148 and the connection of twos complementer 147. The output of adder 151 is used as an estimate of the background level on the opposite side of the pixels being checked for the presence of the laser line. An adder 152 sums the two background estimates computed by adder 149 and adder 151. The output of the adder 152 is proportional to the average of selected pixels on both sides of the pixels being checked for the presence of a laser line.

An adder 146, a twos complementer 145, and an adder 150 perform the same function as the adder 144, the twos complementer 143, and the adder 149, except that the pixels being summed are between the background estimate functions. The sum at the output of adder 150 is an estimate of the amplitude of the pixels being checked for the presence of the laser line.

Specifically, shift register array 157 is a simple delay line, where on each clock, all of the pixels in the array are shifted to the right by one. At any point in time, the data contained in the L8 latch arrays 141 are N pixels of a horizontal scan line (or of two successive scan lines). As described previously, the input data from the ADC is fed to shift register array 157 via a multiplexer 140. Referring momentarily to FIG. 10, the only ADC connected to data culling timing and control circuit 112 is the ADC in analog conditioning A/D conversion circuit 111. As previously described, analog conditioning A/D conversion circuit 111 receives its input from the CCD array 30 in CCD sensor and analog conditioning circuit 110. The CCD array receives its input from the reflected "line of light" transmitted from optical transmitter 2. The CCD array captures an entire frame which clocks out one horizontal line at a time which is read out serially before clocking out the next scan line. The output of the CCD array thus enters shift register 157 sequentially.

For example, assume shift register 157 is 20 pixels long. When the first pixel of the first horizontal scan line is presented to the input of shift register 157, that is, the first L8 latch 141, and the clock rising edge occurs, the array contains

P1 X X X X X X X X X X X X X X X X X X X X where P1 is the first pixel, and X is some unknown (garbage) value. When the second pixel is available and the clock edge occurs, the contents are:

P2 P1 X X X X X X X X X X X X X X X X X X

After 20 clocks (pixels), the array is:

P20 P19 P18 P17 P16 P15 P14 P13 P12 P11 P10 P9 P8 P7 P6 P5 P4 P3 P2 P1

After 100 clocks (pixels) the array is:
P100 P99 P98 P97 P96 P95 P94 P93 P92 P91 P90 P89 P88 P87 P86 P85 P84 P83 P82 P81

On each successive clock, one pixel is clocked in on the left and one is discarded on the right. Since a horizontal scan line is normally hundreds of pixels long, only a portion of the line is contained in the array. As previously stated, if there are N latches in the array, the array contains the last N data values presented to the array.

The output of adders 152 and 150 are compared by comparator 153 to determine if the average amplitude of the pixels being checked for the presence of the laser line are more than twice the average amplitude of the background estimating pixels. The present embodiment detects line average amplitudes which are in a ratio of two to one when compared to the background estimate. Other embodiments could detect lines with other ratios by summing different numbers of pixels, or by including a multiplicative threshold. Other embodiments could also allow for a selectable ratio, by allowing external selection, perhaps by the processor, of which pixels are summed, or by allowing a multiplicative threshold to be selected externally, perhaps by the processor.

The comparison by comparator 153 of adders 152 and 150 thus permits the detection of laser line data. As previously described, adder 144 computes the difference between the value contained in the input mux and the output of the fourth L8 latch. Then, adder 149 accumulates the differences computed by adder 144. Adders 146 and 150 and adders 148 and 151 operate in an analogous fashion to adders 144 and 149.

The most basic function of the adders and comparator in FIG. 12 is to search incoming data for a series of bright pixels surrounded by areas of darker pixels. This condition is an indication that the laser line has been found. This is done by comparing an area in the center of the shift register array to areas to the left and right of the center. If a laser line is present, it should cause the output of adder 150 to be large when compared to the sum of adders 149 and 151 as computed by adder 152.

The output of adder 149 is an estimate of the background level on one side of the group of pixels being checked for the presence of the laser line. Similarly, the output of adder 151 is an estimate of the background level on the other side of the group of pixels being checked for the presence of the laser line. The output of adder 152 is proportional to the average of selected pixels on either side of the pixels being checked for a laser line. The following example illustrates the operation of this circuit.

Assume that the system starts from reset with zeros in all latches and adder registers. Assume also that the array size is 20. The shift register array then starts with the contents
0 0 0 0 0 0 0 0 0 0 0 0 0 0 0 0 0 0 0 0

Assume, now, that the first clock clocks in the first pixel. (This need not be the case, but it simplifies the explanation.) After the first clock, the array contains
P1 0 0 0 0 0 0 0 0 0 0 0 0 0 0 0 0 0 0 0

At this point, adder 144 contains the value P1 (the value of the first pixel), since the positive input of the adder is P1 while the negated input of the adder is 0. Adder (accumulator) 149 contains 0 (the sum of the previous output of adder 144 and the previous output of adder 149).

On the next clock, the array contains
P2 P1 0 0 0 0 0 0 0 0 0 0 0 0 0 0 0 0 0 0
Adder 144 now contains P2 and adder 149 contains P1.
On the next clock, the array contains
P3 P2 P1 0 0 0 0 0 0 0 0 0 0 0 0 0 0 0 0 0

Adder 144 now contains P3 and adder 149 contains P1+P2 (the sum of the old output (P1) of adder 149 plus the old output (P2) of adder 144.

On the next clock, the array contains
P4 P3 P2 P1 0 0 0 0 0 0 0 0 0 0 0 0 0 0 0 0
Adder 144 contains P4 and adder 149 contains P1P2P3 (the sum of the old output (P1+P2) of adder 149 plus the old output (P3) of adder 144.

On the next clock, the array contains
P5 P4 P3 P2 P1 0 0 0 0 0 0 0 0 0 0 0 0 0 0 0
Adder 144 contains P5–P1 (the difference between the mux out put and the fourth latch output),and adder 149 contains P1+P2+P3+P4.

On the next clock, the array contains
P6 P5 P4 P3 P2 P1 0 0 0 0 0 0 0 0 0 0 0 0 0 0
Adder 144 contain P6–P2 (again, the difference between the mux output and the fourth latch output), and the adder 149 contains P2+P3+P4+P5 (the sum of it's previous contents, P1+P2+P3+P4 and the previous adder 144 output, P5–P1)

The pattern continues in this manner. Each successive clock adds in the next value from the input mux, and subtracts out the value moving out of the fourth latch. This circuit always contains the value of the sum of the first four pixels in the shift register array. This is true even if garbage is clocked through the array prior too valid data being clocked through. Adders 146/150 and adders 148/151 work 'the same way as adders 144/149.

Substituting numbers for pixel designators shows how the laser line data are detected. Assume that a image of the laser line is present in the pixels of a particular scan line. Assume that the data received in the shift register array is as follows:
8 9 8 9 9 7 12 18 30 28 16 11 7 7 9 9 8 7 7 8

Now assume that adder 144 is connected as shown in FIG. 12 while adder 146 is connected to the output of the 7th latch, and the 11th latch, that adder 148 is connected to the 14th latch and the 18th latch. The content of adder 144 is 8–9 or 1. The content of adder 146 is 18–11 or 7. The content of adder 151 is 9–7 or 2. The content of adder 149 is 9+8+9+9 or 35. The content of adder 150 is 30+28+16+11 or 85. The content of adder 151 is +8+7+7 or 31. The content of adder 152 is (8+9+9+7) +(8+7+7+8) or 63. (Note that because of the "pipelining" of these arithmetic operations, the content of adder 152 is the sum of the selected background pixels of two clocks previous, whereas the content of adder 150 is the sum of the pixels to be checked of one clock previous.)

The comparator at this point compares the value of 63 and 85. Since the value of the center group of pixels is greater than the summed value of the left and right groups of pixels, which is why this embodiment detects line image average amplitudes that are twice the average amplitude of the background estimating pixels. The transfer of the data is initiated as follows.

Whenever the comparator 153 finds a peak, it generates a peak detect signal which is fed to a peak detect control circuit 156. The peak detect control circuit 156 controls the action to be taken on the occurrence of a peak detection. Peak detection by the control circuit 156 is disabled when the hsync signal is not present. The hsync signal in this system indicates when valid pixels for a line are available. A logic zero exists between lines when black clamping is occurring and when CCD dummy pixels are being read out. When hsync is valid and peak detect is on, a FIFO control state machine 159 in the peak detect control circuit 156 initiates the transfer of a pixel packet into the FIFO circuit 114. This is done by first latching the background estimate in a latch 154 and then issuing the peak detected signal to the FIFO control state machine 159. When hsync goes low, the peak detect control circuit 156 issues a reset signal to a row peak hold circuit 155.

The row peak hold circuit 155 finds the largest pixel value in each row. It does this by comparing each input data value with the largest previous value in the current row and storing the larger of these two values. This peak value is used by the software in the processor 118 to adjust the exposure time on the CCD array 30. If this value is very small for all rows, the software will increase exposure. If it is very large for all rows, and no line is detected, the exposure will be decreased.

The FIFO control state machine 159 controls the writing of data to the FIFO circuit 114. This embodiment sends data to the processor 118 through the FIFO circuit 114. The data sent to the processor 118 is sent in the form of messages, or packets. Four types of packets are used: hsync, vsync, pixel data, and raw data. The FIFO control state machine 159 sends the hsync packet, which includes row peak data, to the FIFO circuit 114 each time a row ends. The state machine 159 sends the vsync packet at the beginning of each frame. The state machine 159 also sends the pixel data packet, which includes row, column, average, and pixel data, each time a peak is detected. When the bypass input signal to the FIFO control state machine 159 is asserted, raw pixel data is sent during each row, followed by an hsync packet. In this mode, vsyncs are also sent at the beginning of each frame. If the gate input signal is off, no data is written into the FIFO circuit 114. The actual writing of data to the FIFO circuit 114 is performed by presenting the data on the nine FIFO data I/O pins of the logic array, and pulsing the FIFO write I/O pin.

The data culling, timing and control circuit 131 includes a test data generator 142 which generates a repetitive pattern of data values that are fed into the input multiplexer 140. If test mode is selected, the multiplexer 140 switches the input to the shift register array 157 to accept input data from the test data generator 142. A multiplexer 160 switches the hsync input from the normal hsync to the test hsync signal supplied by the test data generator 142. The test data generator 142 is used during power-on self-test to verify the functionality of the majority of the data culling, timing, and control circuitry 131.

Figure 13:
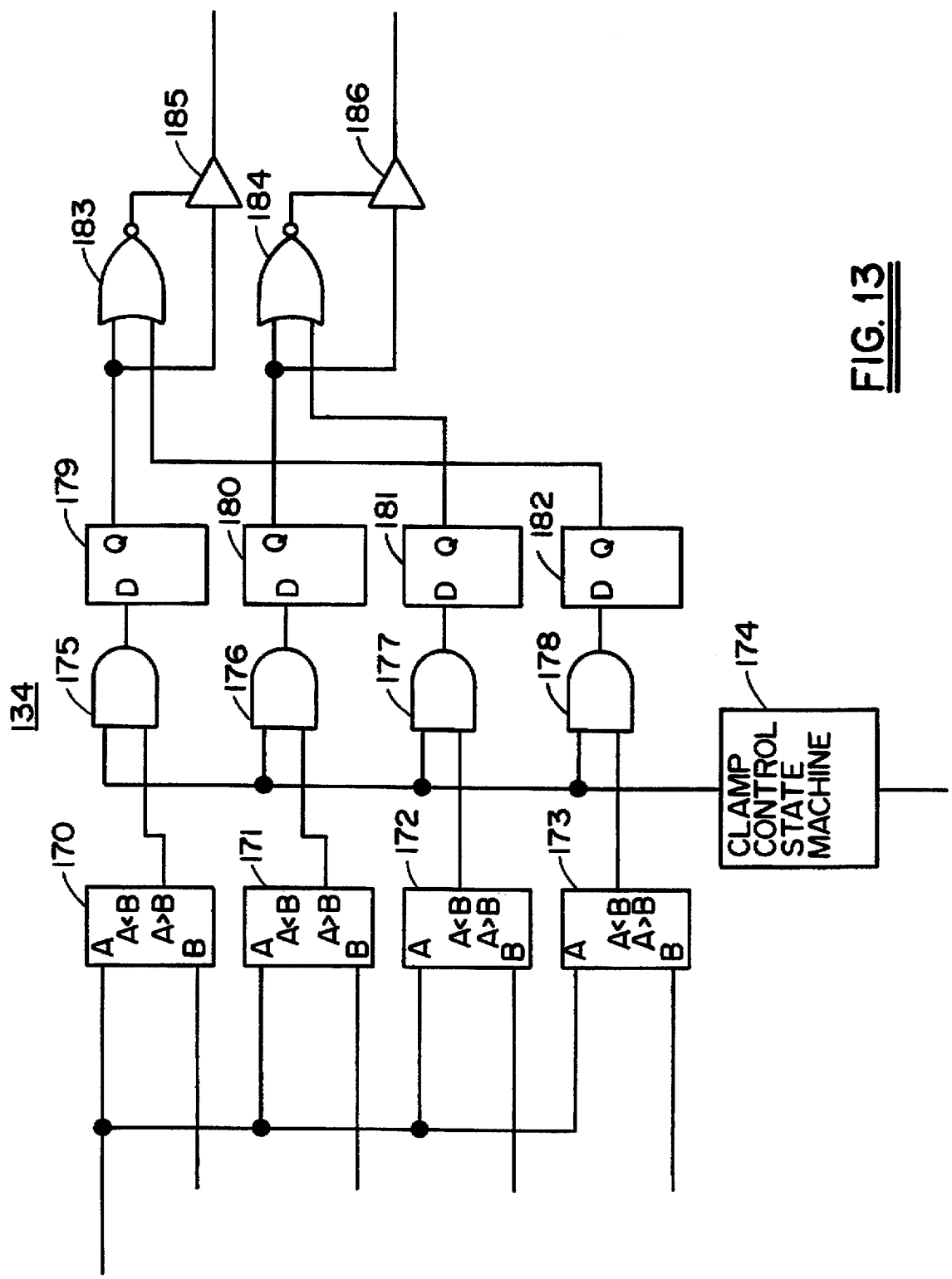
FIG. 13 is a detailed block diagram of the black clamp logic circuit shown in FIG. 11.

With reference now to FIG. 13, there is shown a detailed block diagram of the black clamp logic circuit 134. This circuit is responsible for setting the reference voltage for a black clamp amplifier 258, FIG. 18. This voltage level is controlled by charging or discharging a clamp voltage capacitor 260, shown in FIG. 18. Input data from ADC is fed into four comparators 170-173. These comparators are used to determine if the black level is within a desired range or if an adjustment needs to be made. In this embodiment, the black clamp level is adjusted such that black pixels will be in the range of 16 to 24 A/D counts. If the input is below 4 counts, the clamp capacitor 260 is quickly discharged. If the input is between 4 and 16 counts, the clamp capacitor 260 is discharged more slowly. If the input is above 24 counts, the clamp capacitor 260 is charged slowly. If the input is above 32 counts, the clamp capacitor 260 is quickly charged. Other embodiments could clamp to a different range or use different slow and fast adjustment points.

Comparator 170 compares the input data value to a constant value of 32. If the input is above 32, the comparator "greater than" output is set to a one. This signal is fed to an AND gate 175. The output of AND gate 175 is on only when the input is greater than 32 and an AdjustEnable signal is on. The AdjustEnable signal is used to ensure that black clamping only occurs at times determined by a clamp control state machine 174. A latch 179 is used to synchronize the output to the logic array clock edge. Latches 179-182 prevent any glitching which might occur at the outputs of comparators 170-173 from reaching the outputs of the black clamp logic circuit 134. The output of the latch 179 indicates when fast charging of the clamp capacitor 260 should occur. In a similar manner, the comparator 171, an AND gate 176, and the latch 180 are used to compare the input value to a constant 24. If this input value is greater than 24, the output of latch 180 indicates that the clamp capacitor 260 should be charged at the slower rate. In this embodiment, both the charge and fast charge outputs turn on when the input is in the fast charge range. These outputs could be made independent with only minimal changes. If the input falls between 16 and 24, none of the connected outputs of comparators 170-173 will be on, and therefore none of the latches 179-182 will be on. If the input falls between 4 and 16 A/D counts, comparator 172 will be on, the output of which will be gated by the AdjustEnable signal by an AND gate 177, and the latch 181 will latch the gated output, which indicates that the clamp capacitor 260 needs to be discharged. If the input is below 4 A/D counts, both comparators 172 and 173 will be on. Their outputs will be gated by the AND gate 177 and an AND gate 178, and the gated outputs will be latched by latches 181 and 182. The output of latch 182 indicates that the clamp capacitor 260 must be discharged quickly. Latch 181 will also be on in this embodiment for this condition.

The outputs of latches 179-182 are fed into NOR gates 183 and 184, and output buffers 185 and 186. The output of NOR gate 183 will be low if the outputs of either the fast charge latch 179 or the fast discharge latch 180 are on. The low output from NOR gate 183 enables the output buffer 185. The input of output buffer 185 is connected to the output of latch 179 and is high if the clamp capacitor 260 is to be quickly charged. The input of output buffer 185 is low if the clamp capacitor 260 is to be quickly discharged. If the output of latches 179 and 182 are both off, the FastCharge output is disabled, which allows the clamp capacitor 260 to float at the current level of charge.

The output of latches 180 and 181 are fed into NOR gate 184 and output buffer 186. The output of NOR gate 184 will be low if the output of either the charge latch 180 or the discharge latch 181 is on. The low output from NOR gate 183 enables the output buffer 185. The input of output buffer 185 is connected to the output of latch 180 and is high if the clamp capacitor 260 is to be charged, and is low if the clamp capacitor 260 is to be discharged. If the output of latches 180 and 181 are both off, the Charge output is disabled, which allows the clamp capacitor 260 to float at the current level of charge.

The black clamp logic circuit 134 is controlled by the clamp control state machine 174. This state machine is signaled that black pixels are being output by the CCD array 30 by the BlackPixels input line. When the BlackPixels input line is at a logic one, the clamp control state machine 174 turns on the AdjustEnable signal to indicate when a valid input data value is available at the inputs to comparators 170-173. If the ND converter converts samples in one clock cycle, only every third pixel can be sampled, since the data value will take one cycle to be converted (and reach the logic array input), one cycle to be compared and latched, and the latched adjustment will be on for one cycle. The black clamp logic circuit 134 must wait until the effects of an adjustment are stable before attempting to measure those effects and make another adjustment, or the system will be unstable. If the ND converter takes N cycles to convert a sample, the AdjustEnable signal will turn on every N+2 cycles.

In the current implementation the black level is set to between 16 and 24 ADC output units, which allows the input to span most of the range of the ADC and also allows sufficient ADC range below the desired level to effectively control the black clamp level.

Figure 14:
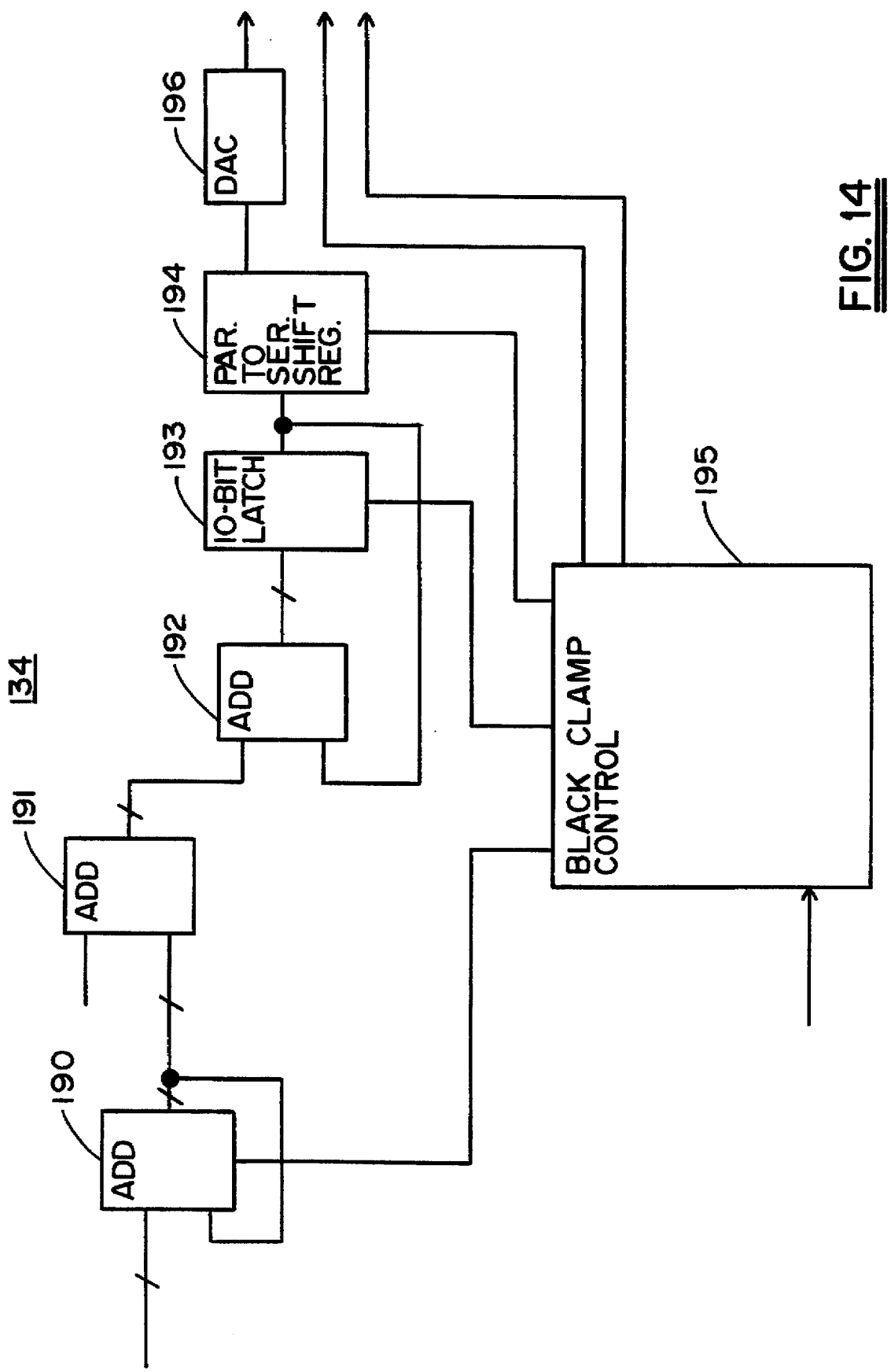
FIG. 14 is a block diagram of an alternate embodiment of the black clamp logic circuit of FIG. 11 which utilizes digital to analog converters.

An alternate embodiment of the black clamp logic circuit 134 can be used to control digital to analog converters (DACs). In this alternate embodiment, the black clamp logic circuit 134 would compute the adjustment required to move from the current measured black level to the desired black level, and adjust the output voltage of the DAC directly. FIG. 14 is a detailed block diagram of this alternate embodiment of the black clamp logic circuit 134. Input data from the ADC is supplied to an adder 190. The registered adder 140 is normally held reset by a black clamp control state machine 195. When the black pixels are being clocked out, black clamp control 195 turns off the ResetAverage signal, the allowing adder 190 to accumulate the sum of 16 pixels. After 16 clocks, the upper 8 bits of this sum are the average of 16 pixels. This average represents the current black pixel level as seen by the ADC. An adder 191 subtracts the desired black pixel level (16) from the measured average to compute a delta which will be used to adjust the output voltage of a DAC 196. The amount that the DAC voltage must change in order to produce a given ADC output change depends on the gains in the analog amplifiers and the ADC and DAC used. In this preferred embodiment, the overall result of these factors is that the ratio of the change in DAC counts to the resulting change in ADC counts should be a power of two, so that the scaling factor to be applied to the delta output from the adder 191 can be a simple shift of bits. A typical value for this ratio would be 1:2. An adder 192 adds the computed delta, with the required shift, to the current DAC level, which is maintained in a latch 193. The resulting new DAC value is then latched into the latch 193. The output of the latch 193 is then transferred to the DAC 196. In this preferred embodiment, this DAC is a serial DAC, although a parallel DAC could be used if additional interface data lines were available between the logic array and the DAC. This new value is then transferred to parallel to a serial shift register 194, which clocks the data out to the DAC 196. The black clamp control state machine 195 supplies the required clock (DacClk) and chip enable (DacCE) signals to the DAC.

The timing of the DacLatch signal and the Serial Shift signal are important to the operation of this scheme. The Reset Average signal should go inactive as soon as black pixel data is available. The DacLatch signal must go active 19 clocks later and stay active for one clock. This delay accounts for 16 clocks to average 16 pixels, plus one clock each for the adders 191 and 192.

Since the DAC output does not drift appreciably over a frame of data, the DAC-based black clamp only needs to be adjusted at the beginning of each frame. Because of the limited range of measurement of the ADC, it may be necessary to adjust the black clamp several times during the black pixel lines at the beginning of a frame to get the value correct. Once it is set correctly, however, it is not necessary to adjust it during each line.

Figure 15:
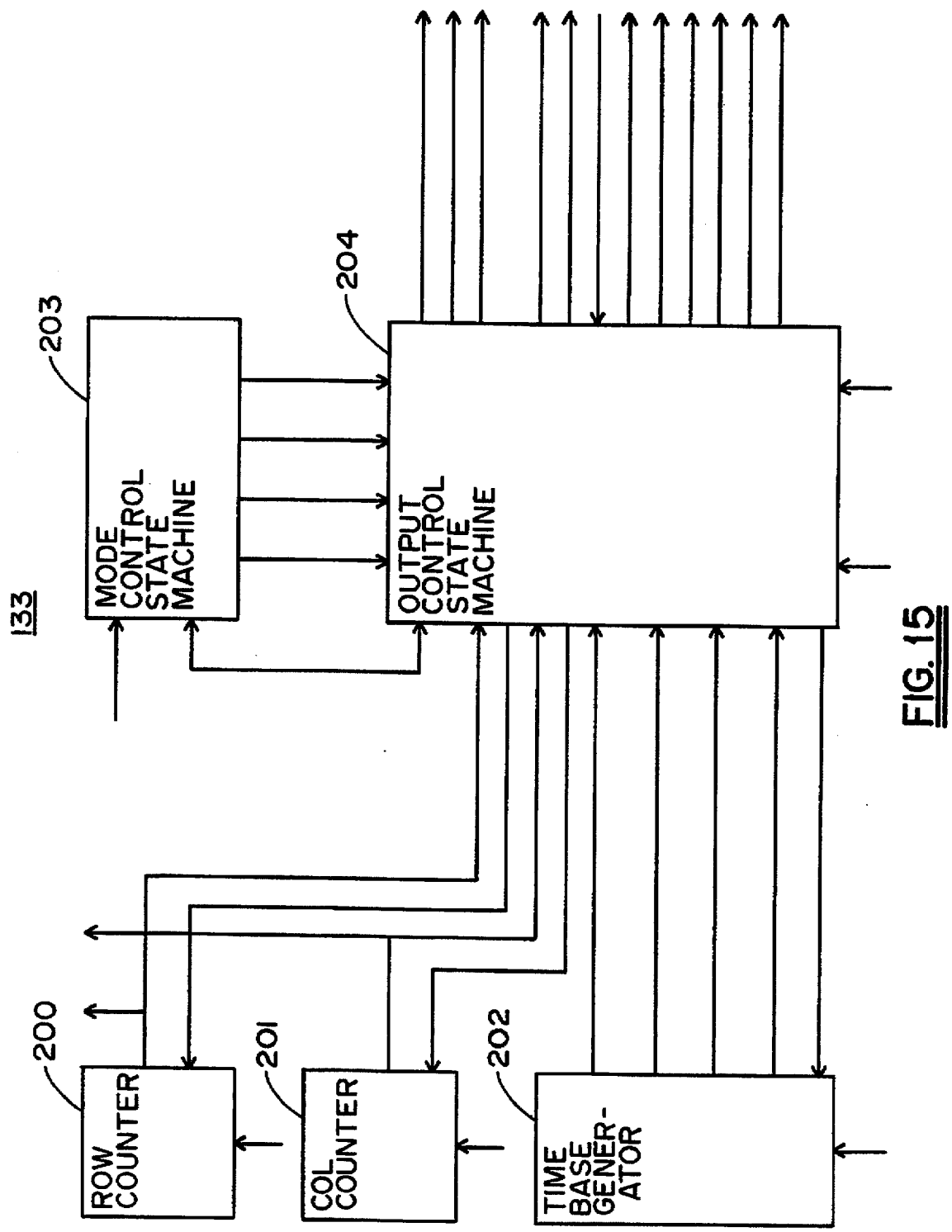
FIG. 15 is a detailed block diagram of the charge coupled device timing generator illustrated in FIG. 11.

FIG. 15 includes a detailed block diagram of the CCD timing generator. The design of this circuit is specific to the particular CCD array 30 used as the optical receiver 3. Several innovations are used in the current embodiment which will be described in detail. Those portions which are well known in the art will not be described in detail.

Referring to FIG. 15, all of the blocks in the CCD timing generator 133 are controlled by a reset signal, labeled PLDReset. When this signal is asserted, the timing generator goes inactive, and all signals go to their initial levels. When the PLDReset signal is turned off, the CCD timing generator 133 generates the signals required to operate the CCD array 30. The CCD array 30 has four different clocking modes which are used in this embodiment. These modes are the discard, expose, parallel, and serial modes. The discard mode is used to clock unwanted pixel information out of the array prior to exposing it to collect the desired image. The expose mode is used to time the exposure of the array to achieve a usable image. Once the array has been exposed, the data is clocked into a storage array on the CCD chip. This mode is referred to as parallel clocking. Finally, the image in the storage array is clocked out serially (i.e. one pixel at a time) to the output amplifiers. These output amplifiers convert the charge in each pixel to a voltage proportional to the light collected by that pixel. A mode control state machine 203 is used to control which of the modes is currently in effect, and when a state change is required, which mode is used next.

In all of the CCD clocking modes, counters are required to keep track of the internal state of the CCD array. Row counter 200 and column counter 201 are used to perform this function. Reset signals (RowRst and ColRst, respectively) are used to restart these counters as required. The outputs of these counters are also provided to the data culling circuit 131 for use in identifying the location of detected peaks in the input data.

A time base generator 202 provides base timing waveforms for various output waveforms. These base waveforms are gated on and off, as required, by an output control state machine 204. The output control state machine 204 controls the CCD driver signals TRG, SAG1, SAG2, SRG1, SRG2, SRG3, IAG, ABG, and ABGMid. These signals are specific to the CCD array 30 used in this embodiment. The exact timing of these signals is not relevant to the novel aspects of the current invention, and methods of generating these signals are known in the art, so they will not be described in detail. The remaining signals are important aspects of this invention, and their use is described.

The VSYNC and HSYNC signals are provided to the data culling circuit 131 to synchronize the operation of data culling with the clocking of the CCD array 30. The VSYNC signal indicates that a frame is complete. The HSYNC signal is asserted when the first valid data pixel of a line is clocked into the logic array, and is turned off when the last valid data pixel in that line is clocked in. The falling edge indicates the end of the line and causes the data culling circuit 131 to complete processing for that line. The BlackPixels signal is turned on when black reference pixels are being clocked out of the CCD array 30. This signal is used by the black clamp logic circuit 134 to initiate adjustment of the black clamp level. If the clamp capacitor 260 embodiment is used for black clamping (FIG. 13), this BlackPixels signal is asserted for the black reference pixels in each line. If the DAC embodiment is used for black clamping (FIG. 14), this BlackPixels signal is only asserted for the black reference lines at the beginning of the array, since black clamping is done only at the beginning of each frame in the DAC embodiment.

The LASERON signal is provided to synchronize the optical transmitter 2 to the CCD array 30 so that the optical transmitter 2 is turned off during parallel clocking and discard clocking. This synchronization prevents smearing of the image caused by the CCD continuing to integrate photons during these clocking intervals.

The Row and Col outputs from the row counter 200 and column counter 201 are provided to the data culling circuit 131 so that the locations of detected peaks can identified.

The EXP0, EXP1, and EXP2 inputs to the output control state machine 204 are used to control the length of time that the CCD array 30 is integrating photons. These control lines allow one of eight different exposure settings to be selected. In the current embodiment, these settings range from approximately 33 ms to approximately 200 microseconds.

When the linehold input is turned on, the output control state machine 204 suspends clocking data at the end of the current line until the linehold input is turned off again. This signal is connected to the half full flag pin from the FIFO circuit 114 on the digital circuit board 92, and is used to suspend clocking of data out of the CCD array 30 while the output FIFO is more than half full. This allows the CCD timing generator 133 to avoid overfilling the FIFO and consequently losing data.

The synchronization afforded by having the CCD timing generator 133 integrated into the digital system allows the system to perform without the hard real time requirements imposed by a free-running CCD camera.

Figure 16:
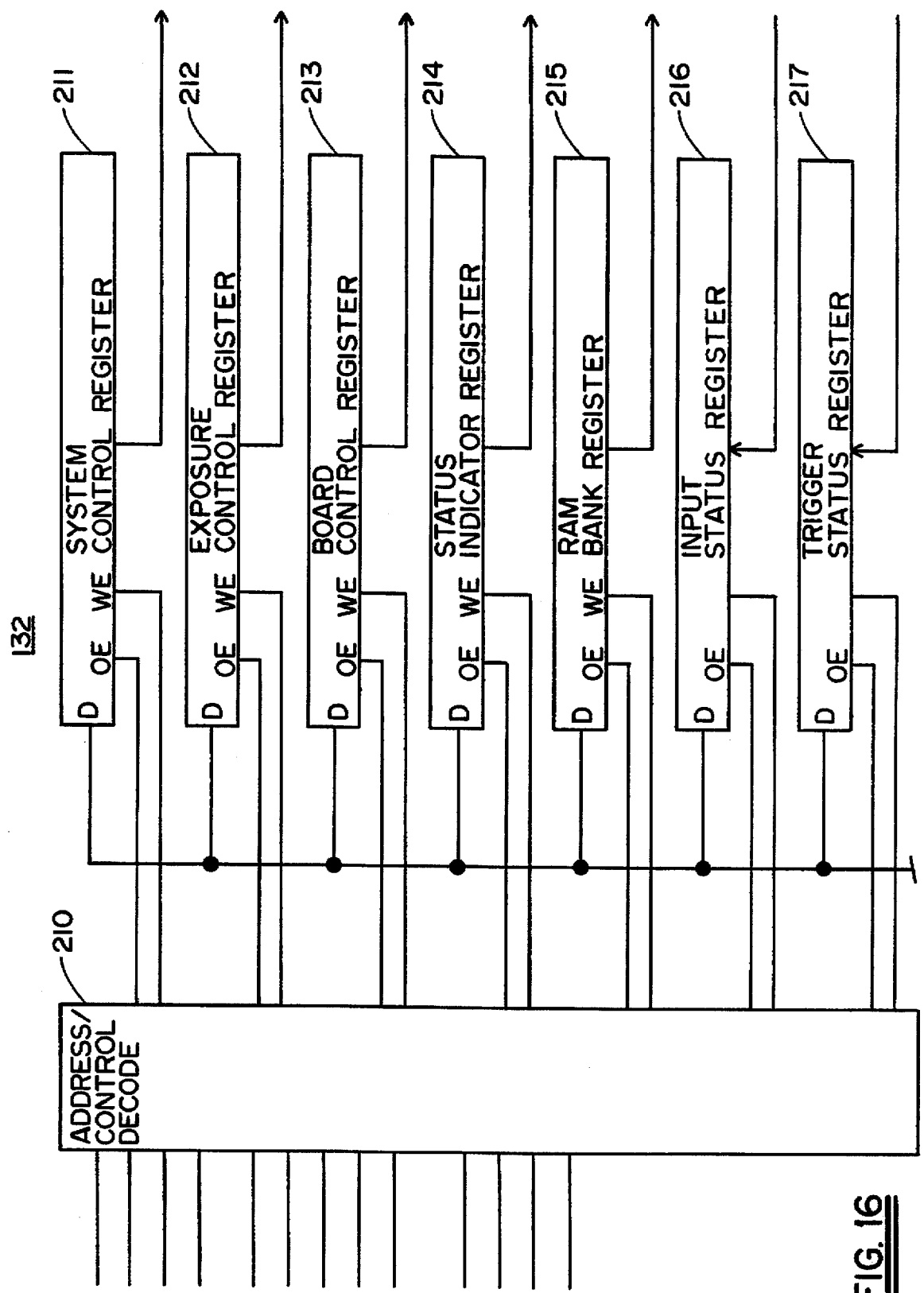
FIG. 16 is a detailed block diagram of the processor interface of FIG. 11.

With reference now to FIG. 16, there is shown a detailed block diagram of the processor interface 132. This circuit performs address and control decoding for the processor 118 and provides a series of registers to control the operation of the logic array. An address/control decode logic 210 decodes the address signals, C50A0–C50A3, the processor 118 control signals, C50DS, C50RD, C50WE, C50IS, C50RW, and from these signals determines what device the processor 118 is attempting to access. Depending on these signals, the address/control decode logic 210 will select one of seven internal ports 211–217, the FIFO circuit 114, or flash RAM circuit 117 as the device to activate. The truth table below represents the decoding scheme used in the address/control decode logic circuit 210.

| C50DS | C50RD | C50WE | C50IS | C50RW | C50A0-3 | OUTPUT LINE ACTIVATED |
|---|---|---|---|---|---|---|
| X | X | F | T | T | 0 | P0 READ |
| X | X | T | T | F | 0 | P0 WRITE |
| X | X | F | T | T | 1 | P1 READ |
| X | X | T | T | F | 1 | P1 WRITE |
| X | X | F | T | T | 2 | P2 READ |
| X | X | T | T | F | 2 | P2 WRITE |
| X | X | F | T | T | 3 | P3 READ |
| X | X | T | T | F | 3 | P3 WRITE |
| X | X | F | T | T | 4 | P4 READ |
| X | X | T | T | F | 4 | P4 WRITE |
| X | X | F | T | T | 5 | P5 READ |
| X | X | F | T | T | 6 | P6 READ |
| X | X | X | T | X | 8 | FIFO_OE |
| X | T | X | T | X | 8 | FIFO_UNCLK |
| T | T | X | X | X | X | RAM_OE |
| T | X | T | X | X | X | RAM_RW |

The FIFO circuit 114 used in this embodiment has separate control lines for output enable (FIFO_OE) and for clocking data out of the FIFO (FIFO_UNCLK). This feature is used to speed up the access to the FIFO. The clocking signal is critical, since a glitch on this line will cause loss of data. The clocking signal (FIFO_UNCLK) is gated with the read data signal (C50RD) from the processor 118. This forces the unclock signal off until all of the address and data lines are stable. The output enable (FIFO_OE) is asserted as soon as all of the required addressing conditions are met. This output enable may glitch if the addressing lines do not change simultaneously. However, since the clocking signal (FIFO_UNCLK) is glitch free, data will not be lost. This method of interfacing to the FIFO circuit 114 allows the processor 118 nearly 100 ns for access. If the output enable (FIFO_OE) was gated with the read data signal (C50RD), half of the processor cycle time would be wasted, and faster FIFOs or a wait state would be required.

Figure 17:
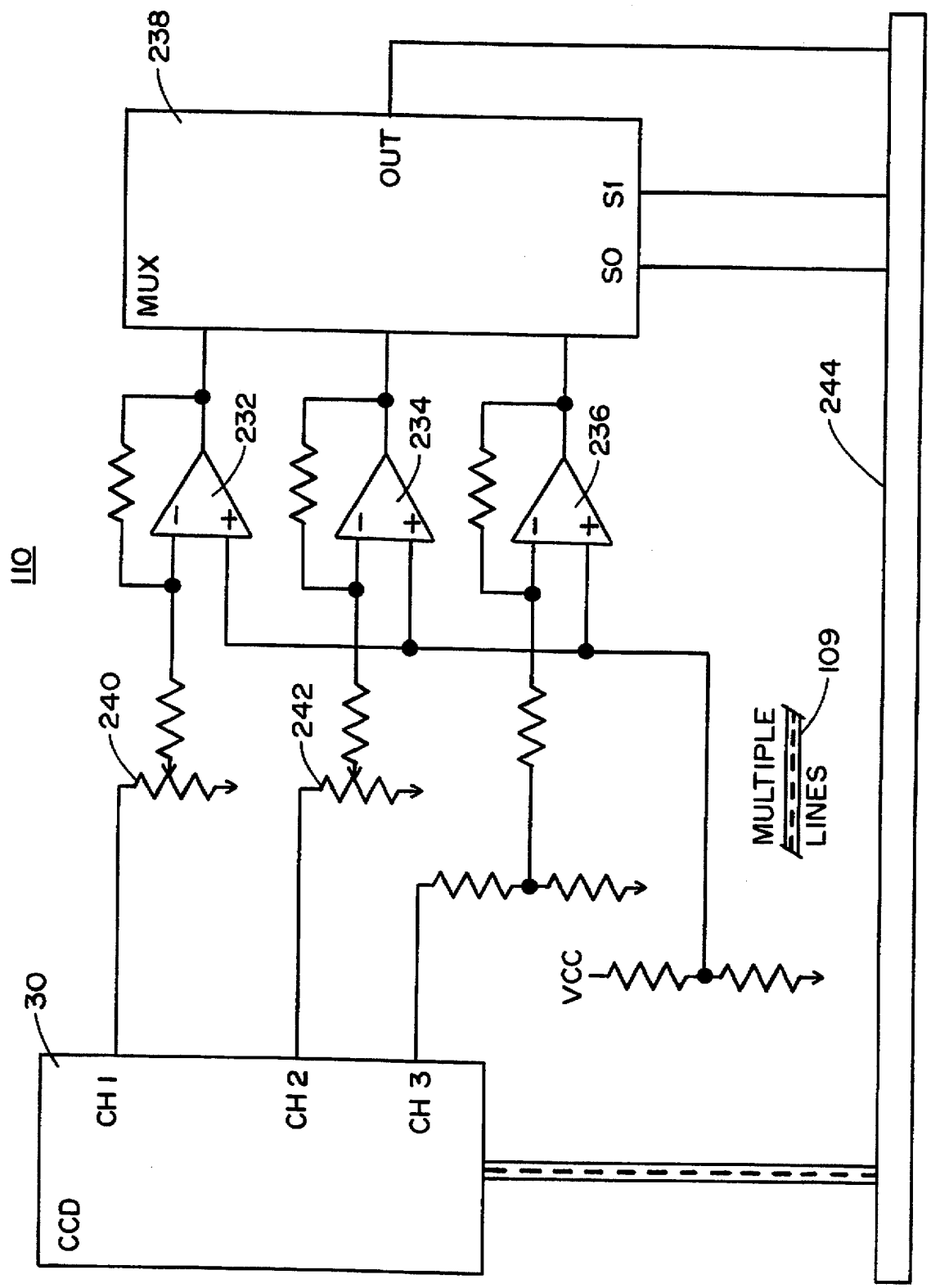
FIG. 17 is a schematic representation of an analog circuit board which performs the CCD sensor and analog conditioning functions represented in FIG. 10.

FIG. 17 is a schematic representation of the CCD sensor and analog conditioning circuit 110. It comprises the CCD array 30, level shifting buffer amplifiers 232, 234, and 236, and a multiplexer 238. The CCD array 30 in this embodiment has three output channels, although a CCD array with one output channel could be used. The three output channels are fed into the level shifting buffer amplifiers 232, 234, and 236. These amplifiers provide a gain of 4 and invert the video signals. Potentiometers 240 and 242 are used to minimize the voltage offset differences between the three channels. An alternate embodiment uses digital to analog converters (DACs) to adjust these offsets automatically. The output of the three amplifiers is fed through the multiplexer 238 which is switched each pixel clock cycle to select the correct amplifier output. The output of the multiplexer 238 is routed to a cable connector 244 which also carries the CCD timing signals and the multiplexer control.

Figure 18:
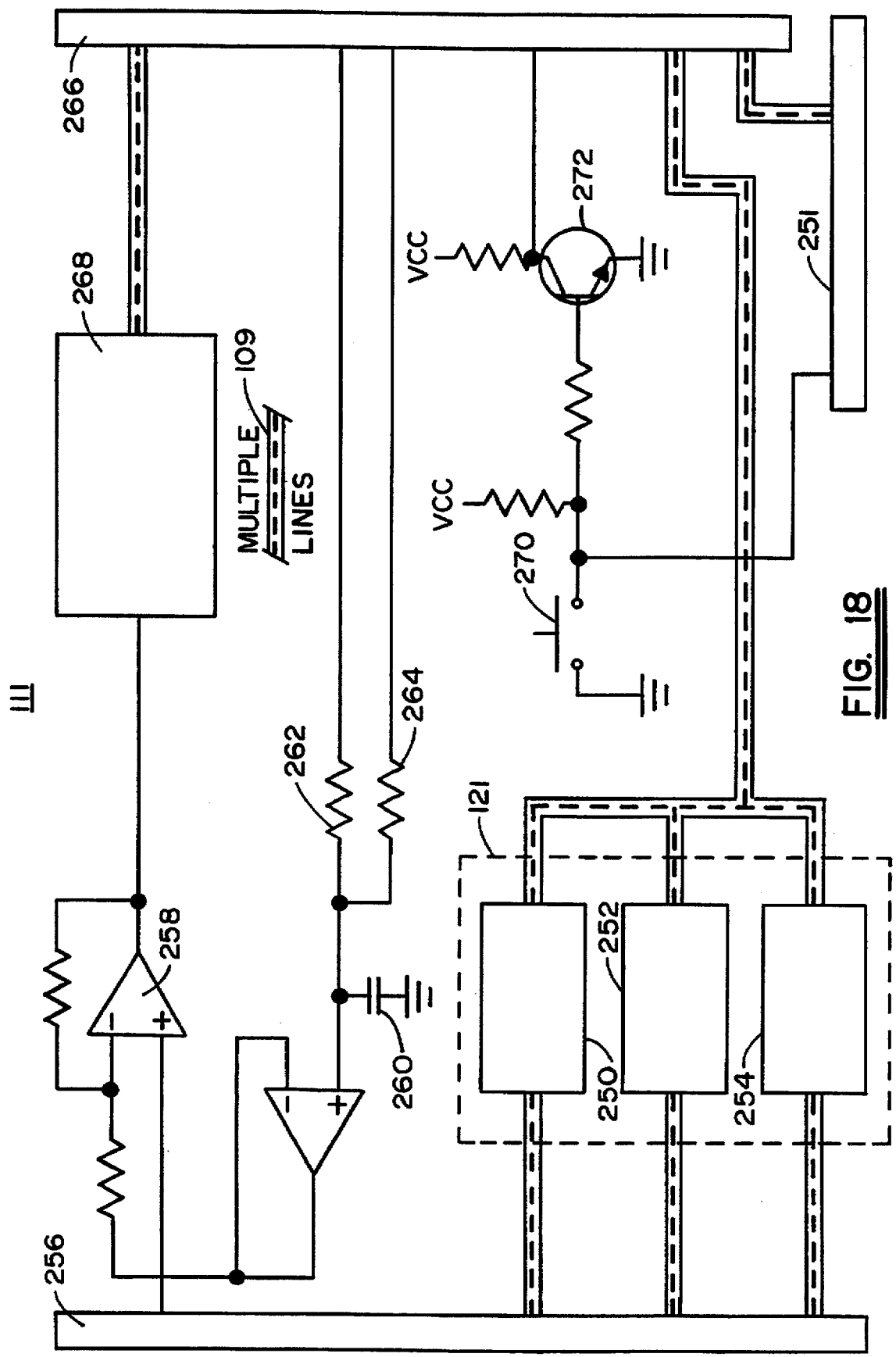
FIG. 18 is a schematic representation of a driver/power supply circuit board which performs the CCD driver and power supply functions illustrated in FIG. 10.
Figure 19:
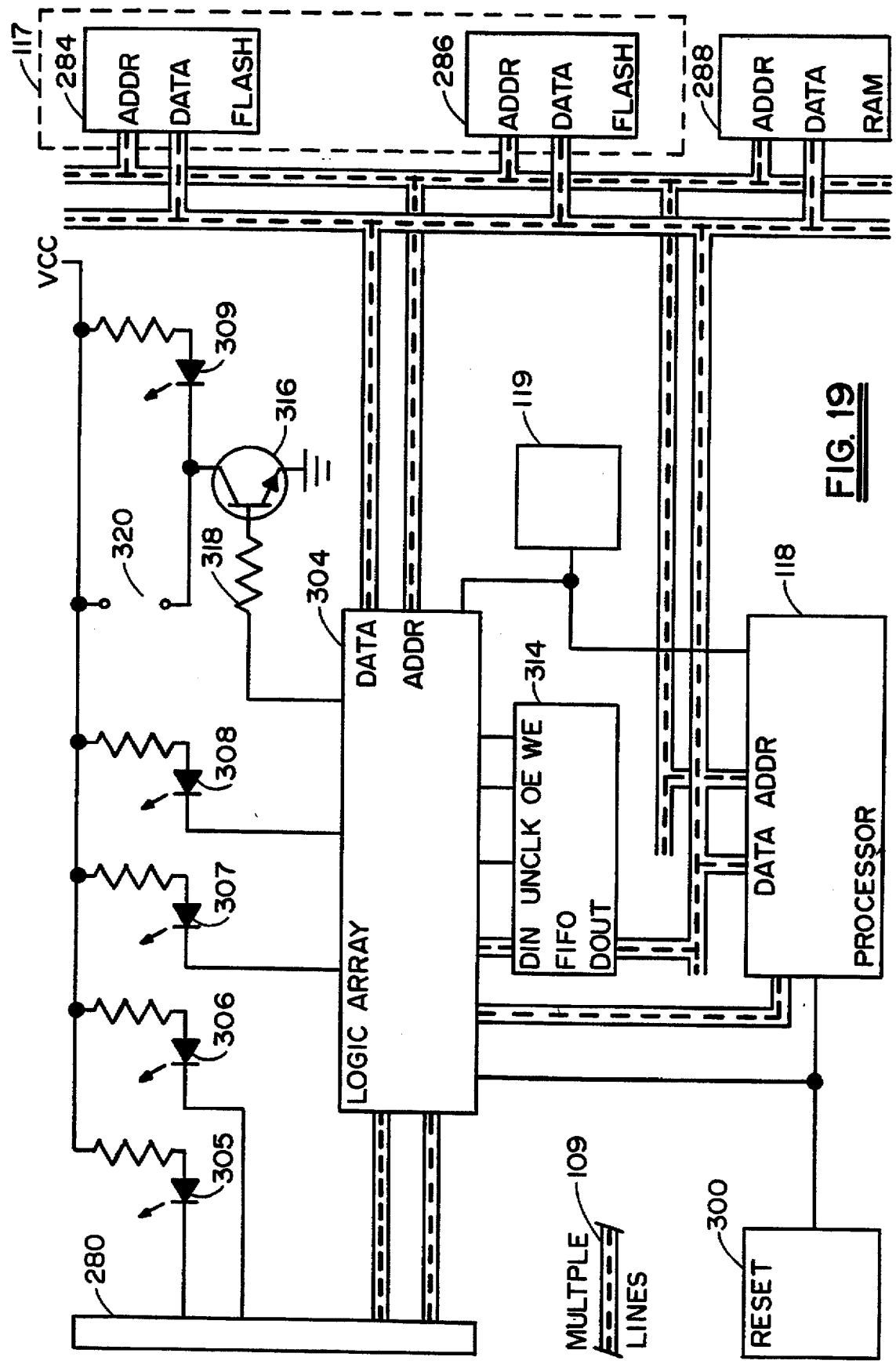
FIG. 19 is a detailed block diagram of a digital board employed in conjunction with the present invention to perform the culling and processing functions represented in FIG. 10.

FIG. 18 is a schematic representation of the analog conditioning and A/D conversion circuit 111. The CCD timing signals are converted from TTL levels to CCD voltage levels using three CCD driver integrated circuits 250, 252, and 254. The three driver circuits 250, 252, 254 comprise the CCD driver circuit 121 shown in FIG. 10. The CCD voltage signals are routed to a connector 256 which connects via a cable to the analog circuit board 90. The analog signal from the analog circuit board 90 is fed into a black clamp amplifier 258. The amplifier 258 is used to adjust the DC level of the analog signal. The DC level is adjusted by charging or discharging the clamp capacitor 260 through resistor 262 or 264. The charging or discharging of the clamp capacitor 260 is, in turn, controlled by the logic array on the digital circuit board 92, through signals routed from 266. The DC level is adjusted such that dark reference pixels in the analog signal are at a voltage that corresponds to an ADC 268 output value of 16. This black clamping keeps the signal voltage in a range which makes best use of the range of the ADC 268. The size of the black clamp capacitor 260 is chosen such that it can maintain the DC level for more than the amount of time required to clock out a line of pixels, since the dark reference pixels are only available at the ends of the lines. In an alternate embodiment of this system, the DC level of the black clamp amplifier 258 can be adjusted by using a digital to analog converter (DAC) to generate the required reference voltage to the black clamp amplifier 258. The ADC 268 converts the analog signal output from the black clamp amplifier 258 to a digital signal, which is transferred to the digital circuit board 92 via connector 266. Connector 251 provides the connection to the external decoder or computer with which the device interfaces. Switch 270 is a trigger switch, which provides a signal to the external decoder or computer, as well as to the digital circuit board 92, through a transistor 272. FIG. 19 is a detailed schematic representation of the data culling, timing, and control circuit 112 implemented here as logic array 304; the FIFO circuit 114 implemented as FIFO 314; SRAM circuit 116 implemented here as a byte-wide static RAM 288; flash RAM 117 implemented as flash RAM modules 284 and 286. Connector 280 provides power and signals to and from the driver/power supply board 91. The processor 118 provides signal processing, data processing, and control functions for the system. The instructions for the processor 118, as well as the programming for the logic array 304 are stored in flash RAM modules 284 and 286. The processor 118 can read and write data to these modules, and can, through a serial interface, completely reprogram the functionality of the system by loading new instructions and logic array programming into the flash RAM 117. This allows for easy field upgrade of software and hardware for bug fixes and feature enhancement. The processor 118 can write and read data in the byte-wide static RAM 288. The static RAM 288 is bank switched to allow access to 512K bytes of RAM. The processor clock is provided by the clock 119. The clock 119 in this embodiment preferably runs at 10 MHz, but could be run at other speeds to speed up the processing or to reduce power. Power-on reset IC 300 provides power-on reset signals for the logic array 304 and the processor 118. The logic array 304 is preferably a field programmable gate array (FPGA) which contains the data culling, timing and control circuit 112. Light emitting diodes 305-309 are indicator lamps to provide status information to the user, through the back window of the housing. FIFO 314 is used to interface between the logic array 304 and the processor 118. A transistor 316 is used to control the laser module 115. When a base resistor 318 is pulled high, the transistor 316 will conduct, causing current to flow into the laser module 115 via 320.

While this invention has been described in detail with reference to certain preferred embodiments, it should be appreciated that the present invention is not limited to those precise embodiments. Rather, in view of the present disclosure which describes the best mode for practicing the invention, many modifications and variations would present themselves to those of skill in the art without departing from the scope and spirit of this invention, as defined in the following claims.

What is claimed is:

1. A non-contact apparatus for reading a surface that has information encoded in a relief pattern thereon, the relief pattern having relatively raised and recessed portions and transitions therebetween, the recessed portions having bottom surfaces being aligned in a lengthwise direction, said apparatus comprising:

optical transmitter means for projecting a line of light onto the raised portions of the relief pattern and onto the bottom surfaces of the recessed portions of the relief pattern at a first angle to a normal of the surface;

optical receiver means for viewing said projected line of light on the relief pattern at a second angle to the normal of the surface and for producing signal data that is representative of an image of a reflection of said line of sight whereby said image includes a parallactic displacement of said projected line at a transition between a raised portion and the bottom surface of a recessed portion of the relief pattern therealong;

means for culling said signal data received by said receiver means such that only those pixels substantially constituting the image of the line of light are selected; whereby said culling means culls within said line by detecting said pixels that exceeds an estimate of a level of a background information and means for decoding said culled signal data into electrical signals which represent decoded information contained in the relief pattern.

2. The apparatus according to claim 1 further comprising analog processing means for amplifying and shifting the output level of said signal data.

3. The apparatus according to claim 2 further comprising means for digitizing said amplified and shifted signal data.

4. The apparatus according to claim 1 further comprising power management circuitry to enable battery powered operation of said apparatus.

5. The apparatus according to claim 1 wherein said optical receiver means includes an optical axis and an array disposed at a tilt angle φ with respect to a plane that is normal to said optical axis.

6. The apparatus according to claim 1 further comprising a trigger switch utilized to initiate bar code scanning.

7. The apparatus according to claim 1 wherein said optical transmitter means produces a fan beam of light.

8. The apparatus according to claim 1 further comprising video black clamping means for adjusting a level of a video signal to match a range of an analog to digital converter.

9. The apparatus according to claim 8 wherein said video black clamping means includes a charge or discharge pulse across a capacitor.

10. The apparatus according to claim 8 wherein said video black clamping means includes a digital to analog converter.

11. The apparatus according to claim 1 wherein said optical transmitter means, said optical receiver means, said means for culling, and said means for decoding are contained in a fixed mount unit.

12. The apparatus according to claim 1 wherein said culling means selects pixels to be processed based on an adaptive threshold.

13. The apparatus according to claim 1 wherein said culling means selects pixels to be processed based on a local estimate of a background pixel intensity.

14. The apparatus according to claim 1 wherein said culling means selects pixels to be processed based on a ratio of an estimate of a pixel intensity of said image to an estimate of a local background pixel intensity.

15. A non-contact apparatus for reading a surface that has information encoded in a relief pattern thereon, the relief pattern having relatively raised and recessed portions and transitions therebetween, the recessed portions having bottom surfaces being aligned in a lengthwise direction, said apparatus comprising:

optical transmitter means for projecting a line of light onto the raised portions of the relief pattern and onto the bottom surfaces of the recessed portions of the relief pattern at a first angle to a normal of the surface;

optical receiver means for viewing said projected line of light on the relief pattern at a second angle to the normal of the surface and for producing signal data that is representative of an image of a reflection of said line of sight whereby said image includes a parallactic displacement of said projected line at a transition between a raised portion and the bottom surface of a recessed portion of the relief pattern therealong;

means for culling, said signal data received by said receiver means so that only those pixels substantially constituting the image of the line of light are selected;

means for decoding said culled signal data into electrical signals which represent decoded information contained in the relief pattern;

said optical transmitter means, said optical receiver means, said means for culling and said means for decoding are contained within a portable handheld unit; and said optical transmitter means and said optical receiver means being at opposite ends of a hand grip of said hand held unit.

16. A non-contact apparatus for reading a surface that has information encoded in a relief pattern thereon, said relief pattern having a relatively raised portion and a relatively recessed portion and a transition therebetween, said recessed portion having a bottom surface aligned in a lengthwise direction, said apparatus comprising:

an optical transmitter effective for projecting a line of light onto said raised portion of said relief pattern and onto said bottom surface of said recessed portion of said relief pattern at a first angle to a normal of said surface;

an optical receiver effective for viewing said projected line of light on said relief pattern at a second angle to said normal of said surface;

said optical receiver producing a plurality of pixels representative of an image of a reflection of said line of sight wherein said image includes a parallactic displacement of said projected line at a transition between said raised portion and said bottom surface of said recessed portion;

a data culling circuit wherein only those pixels substantially constituting the image of the reflection of said line of light are selected, thereby producing culled signal data whereby said culling means culls within said line by detecting said pixels that exceeds an estimate of a level of background information; and a decoder effective for decoding said culled signal data into electrical signals which represent decoded information contained in said relief pattern.

17. An apparatus according to claim 16, wherein said data culling circuit includes:

a shift register array;

first means for measuring a first sum of a first group of pixels in said shift register array;

second means for measuring a second sum of a second group of pixels of said shift register array;

third means for measuring a third sum of a third group of pixels of said shift register array;

means for averaging said first and second sums to produce an average sum;

means for comparing said second sum to said average sum to detect a peak.

18. A hand-held apparatus for reading a relief pattern on a surface, comprising:

a hand-held housing having first and second ends separated by a hand grip;

optical transmitter means, mounted in said first end, for projecting a line of light onto the surface;

optical receiver means, mounted in said second end, for receiving an image reflected from said surface;

said image including an image of said line of light;

conversion means for converting said image to a plurality of pixels;

culling means, mounted in said hand-held housing, for culling said plurality of pixels such that only those pixels substantially constituting said image of said line of light are selected; and means for decoding said culled plurality of pixels into electrical signals representing decoded information contained in the relief pattern.

* * * * *